US005619397A

United States Patent [19]
Honda et al.

[11] Patent Number: 5,619,397
[45] Date of Patent: Apr. 8, 1997

[54] ELECTRONIC DEVICE SYSTEM INCLUDING A PORTABLE ELECTRONIC DEVICE HAVING A HANDWRITING INPUT DEVICE LOCKED TO AN EXPANSION STATION WHEN THE POWER SWITCH OF THE PORTABLE ELECTRONIC DEVICE IS TURNED ON

[75] Inventors: Masami Honda, Tokyo; Yosuke Miura, Funabashi, both of Japan

[73] Assignee: Kabushiki Kaisha Toshiba, Kanagawa-Ken, Japan

[21] Appl. No.: 509,617

[22] Filed: Jul. 31, 1995

[30] Foreign Application Priority Data

Sep. 29, 1994 [JP] Japan .................................... 6-235696

[51] Int. Cl.⁶ .............................. G06F 1/16; H05K 7/10; H01R 13/639
[52] U.S. Cl. .......................... 361/686; 439/157; 439/352
[58] Field of Search ...................... 439/157, 159, 439/160, 352, 923; 220/4.02, 691, 683, 693; 364/708.1; 292/341.16; 70/283; 395/281, 283, 800; 361/681, 686

[56] References Cited

U.S. PATENT DOCUMENTS

| | | | |
|---|---|---|---|
| 4,345,147 | 8/1982 | Aaron et al. | 361/686 X |
| 4,528,597 | 7/1985 | Klein et al. | 358/838 |
| 4,659,159 | 4/1987 | Takahashi | 439/345 |
| 4,746,304 | 5/1988 | Asai | 439/248 |
| 4,749,364 | 6/1988 | Arney et al. | 439/372 |
| 5,077,722 | 12/1991 | Geist et al. | 439/157 X |
| 5,133,076 | 7/1992 | Hawkins et al. | 395/800 |
| 5,144,290 | 9/1992 | Honda et al. | 345/156 |
| 5,168,429 | 12/1992 | Hosoi | 361/395 |
| 5,175,671 | 12/1992 | Sasaki | 361/686 |
| 5,192,222 | 3/1993 | Krause et al. | 439/347 |
| 5,196,991 | 3/1993 | Hsieh | 361/681 |
| 5,196,993 | 3/1993 | Herron et al. | 361/681 |
| 5,229,920 | 7/1993 | Spaniol et al. | 361/681 X |
| 5,253,139 | 10/1993 | Satou | 361/681 |
| 5,262,759 | 11/1993 | Moriconi et al. | 345/30 |
| 5,283,714 | 2/1994 | Tsai et al. | 361/683 |
| 5,292,267 | 3/1994 | Kobayashi et al. | 439/310 |
| 5,313,596 | 5/1994 | Swindler et al. | 364/708.1 X |
| 5,316,491 | 5/1994 | Satou et al. | 439/159 |

(List continued on next page.)

FOREIGN PATENT DOCUMENTS

| | | | |
|---|---|---|---|
| 1-273086 | 10/1989 | Japan | G09F 9/00 |
| 4-1798 | 1/1992 | Japan | G09G 5/00 |
| 4-195507 | 7/1992 | Japan | G06F 1/16 |
| 4-342005 | 11/1992 | Japan | G06F 3/00 |
| 5-80886 | 4/1993 | Japan | G06F 1/18 |

*Primary Examiner*—Michael W. Phillips
*Attorney, Agent, or Firm*—Limbach & Limbach

[57] ABSTRACT

An electronic device system comprises a portable computer including an input surface through which information is input, a power switch manually turned on or off, and a first connector electrically connected to the power switch, and an expansion station having an expansion device for expanding a function of the computer and an input section connected to a power supply. The expansion station include a main body containing the expansion device and the input section, a stand supported by the main body and removably holding the computer, and a second connector arranged in the stand and connected to the first connector when the computer is held by the stand. The stand includes a pair of engaging members movable between a first position, in which they hook the computer, and a second position, in which they are released from the computer, when the first and second connectors are connected to each other, and lock means movable between a lock position, in which the engaging members are inhibited from being moved from the first position to the second position, and a lock release position, in which the engaging members are allowed to move from the first position to the second position. The lock means is maintained in the lock position, when the computer is connected to the power supply through the first and second connectors and the power switch is turned on.

14 Claims, 21 Drawing Sheets

U.S. PATENT DOCUMENTS

| | | | |
|---|---|---|---|
| 5,323,291 | 6/1994 | Boyle et al. | 361/686 X |
| 5,329,427 | 7/1994 | Hogdahl | 361/730 |
| 5,347,425 | 9/1994 | Herron et al. | 361/683 |
| 5,355,279 | 10/1994 | Lee et al. | 361/681 |
| 5,436,792 | 7/1995 | Leman et al. | 361/686 |
| 5,450,271 | 9/1995 | Fukushima et al. | 361/686 |
| 5,452,180 | 9/1995 | Register et al. | 361/686 |
| 5,463,742 | 10/1995 | Kobayashi | 395/281 |
| 5,526,493 | 6/1996 | Shu | 395/281 |

ELECTRONIC DEVICE SYSTEM INCLUDING A PORTABLE ELECTRONIC DEVICE HAVING A HANDWRITING INPUT DEVICE LOCKED TO AN EXPANSION STATION WHEN THE POWER SWITCH OF THE PORTABLE ELECTRONIC DEVICE IS TURNED ON

BACKGROUND OF THE INVENTION

1. Field of the Invention

The present invention relates to an electronic device system including an electronic device, such as a portable computer, employing a pen-input system and an expansion station for expanding a function of the electronic device.

2. Description of the Related Art

A kind of book-type portable computer is known, to which information is input through a handwriting input device using a pressure-sensitive tablet and a stylus pen. The computer employing the pen input system includes a flat case, having an upper surface on which an input surface of the tablet is formed. The case of this kind of computer is designed to be compact, since the portability is more important in this computer as compared to a general portable computer having a keyboard. Since the compact case has little space inside, it cannot incorporate various function devices, such as a large-capacity memory device.

For this reason, the pen-input type computer has a plurality of connectors or ports on the back surface of the case to expand the function of the computer. Recently, there is a great demand for connecting a pen-input type computer to a hard disk drive, a CD-ROM drive, or an expansion station having a number of expansion ports, thereby adding a new function to the computer.

In the pen-input type computer, however, since the input surface also serves as a display for displaying figures or letters, the computer does not comprise a display unit as used in the conventional book-type or lap top computers. Therefore, when the computer is to be connected to the expansion station, if the case of the computer is placed so as to face upward on the upper surface of the expansion station, the input surface of the computer is inevitably horizontal. In this state, the visibility of the input surface may be degraded or information cannot be efficiently input by the stylus pen.

Further, since an advantage of the pen-input type computer is convenience in portability, even when it is connected to the expansion station, it is preferable that the connection be released easily. In this case, however, when a signal is transmitted between the computer and the expansion station, the computer may be unexpectedly removed from the expansion station. As a result, the computer is electrically disconnected from the expansion station, and important information may be deleted or the computer may malfunction.

To cope with this problem, it is proposed to provide the expansion station with a locking device for disconnectably locking the computer. However, with this constitution, the locking device must be operated to the locking position, after the computer is connected to the expansion station. In addition, to remove the computer from the expansion station, it is necessary that the lock of the computer should be released in advance. For this reason, it takes a considerable time to connect or disconnect the computer to or from the expansion station.

SUMMARY OF THE INVENTION

The present invention has been made in consideration of the aforementioned situation. It is accordingly an object of the present invention to provide an electronic device system in which, in a state where an electronic device is connected to an expansion station, information can be efficiently input to the electronic device and the electrical connection between the electronic device and the expansion station can be ensured, without a special locking or lock-releasing operation, so that the electronic device can easily be connected to or disconnected from the expansion station.

To achieve the above object, an electronic device system of the present invention comprises:

a portable electronic device including an input surface through which information is input, a power switch manually turned on or off, and a first connector electrically connected to the power switch; and an expansion station having an expansion device for expanding a function of the electronic device and an input section connected to a power supply, the expansion station including: a main body containing the expansion device and the input section; a stand supported by the main body and removably holding the electronic device, the stand maintaining the main body together with the input surface in a stand-up state; and a second connector arranged in the stand, the second connector being electrically connected to the expansion device and the input section, and connected to the first connector when the electronic device is held by the stand.

The stand includes: a pair of engaging members movable between a first position, in which they hook first and second ends in a width direction of the electronic device, and a second position, in which they are released from the first and second ends of the electronic device, when the first and second connectors are connected to each other; and lock means movable between a lock position, in which the engaging members are inhibited from being moved from the first position to the second position and a lock release position, in which the engaging members are allowed to move from the first position to the second position. The lock means is maintained in the lock position, when the electronic device is connected to the power supply through the first and second connectors and the power switch of the electronic device is turned on.

With the above constitution, to expand the function of the electronic device, first the expansion station is connected to the power supply, so that it is on standby. After confirming the power switch of the electronic device is off, the electronic device is attached to the stand of the expansion station. As a result, the first connector of the electronic device is connected to the second connector of the stand, that is, the electronic device is electrically connected to the expansion station. When the first and second connectors are connected to each other, the pair of engaging members hook the electronic device, so that the electronic device is unremovably held by the stand. For this reason, the electronic device is maintained in a stand-up state together with the input surface, which faces the operator.

In a state where the electronic device is electrically connected to the expansion station, when the power switch of the electronic device is turned on, the lock means is moved to the lock position and the engaging members are locked at the first position. As a result, the engaging members are kept hooked in the electronic device, thereby preventing the electronic device from being removed from the stand. For this reason, when the power switch of the electronic device is turned on and a signal is transmitted between the electronic device and the expansion station, it is impossible to remove the electronic device from the stand of the expansion station.

When the power switch of the electronic device is turned off, the lock of the engaging members by the lock means is released so that the engaging members can be moved freely from the first position to the second position. For this reason, when a signal is not transmitted between the electronic device and the expansion station, it is possible to remove the electronic device from the stand. Thus, the lock means of the expansion station can be controlled simply by the operation of turning on or off the power switch, without a particular lock operation or lock releasing operation.

The computer system of the present invention comprises:

a portable computer having a pen for inputting information, an input surface pressed by the pen, a power switch manually turned on or off, a controller for outputting a signal, when the power switch is turned on, and a first connector to which the signal from the controller is supplied;

an expansion station having an expansion device for expanding a function of the computer and an input section connected to a power supply, the expansion station including: a main body containing the expansion device and the input section; a holding portion supported by the main body and removably holding the computer, the holding portion maintaining the main body together with the input surface in a stand-up state: and a second connector arranged in the holding portion, the second connector being electrically connected to the expansion device and the input section, and connected to the first connector when the computer is held by the holding portion.

The holding portion of the expansion station includes: a pair of engaging members movable between a first position in which they hook the computer and a second position in which they are released from the computer, when the first and second connectors are connected to each other; and lock means movable between a lock position, in which the engaging members are inhibited from being moved from the first position to the second position, and a lock release position, in which the engaging members are allowed to move from the first position to the second position. The lock means is maintained in the lock position, when the computer is connected to the power supply through the first and second connectors and the lock means receives the signal output from the controller through the first and second connectors.

With the above constitution, to expand the function of the computer, first the expansion station is connected to the power supply, so that it is on standby. After confirming the power switch of the computer is off, the computer is attached to the holding portion of the expansion station. As a result, the first connector of the computer is connected to the second connector of the holding portion, that is, the computer is electrically connected to the expansion station. When the first and second connectors are connected to each other, the pair of engaging members hook the computer, so that the computer is unremovably held by the holding portion. For this reason, the computer is maintained in a stand-up state together with the input surface, which faces the operator.

In a state where the computer is electrically connected to the expansion station, when the power switch of the computer is turned on, a signal is output from the controller. The signal is transmitted to the lock means through the first and second connectors. The lock means is moved to the lock position upon reception of the signal from the controller and the engaging members are locked at the first position. As a result, the engaging members are kept hooked in the computer, thereby preventing the computer from being removed from the holding portion. For this reason, when the power switch of the computer is turned on and a signal is transmitted between the computer and the expansion station, it is impossible to remove the computer from the holding portion of the expansion station.

When the power switch of the computer is turned off, the lock of the engaging members by the lock means is released, so that the engaging members can be moved freely from the first position to the second position. For this reason, when a signal is not transmitted between the computer and the expansion station, it is possible to remove the computer from the holding portion. Thus, the lock means of the expansion station can be controlled simply by the operation of turning on or off the power switch, without a particular lock operation or lock releasing operation.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 1 to 31 are diagrams showing a first embodiment of the present invention, in which:

FIG. 1 is a perspective view of a pen-input type portable computer;

FIG. 2 is a perspective view of an electronic system in a state where the pen-input type portable computer is connected to an expansion station;

FIG. 3 is a perspective view of the expansion station as viewed from a right side;

FIG. 4 is a perspective view of the expansion station as viewed from a left side;

FIG. 5 is a perspective view of the expansion station as viewed from an upper side;

FIG. 6 is a perspective view of the expansion station as viewed from a rear slide;

FIG. 7 is a cross-sectional view of the electronic system in a state where the pen-input type portable computer is connected to the expansion station;

FIG. 8 is a rear view of the expansion station;

FIG. 9 is a perspective view showing a left side end portion of a stand;

FIG. 10 is a perspective view showing a right side end portion of the stand;

FIG. 11 is a cross-sectional view of a portion at which a front panel and a rear panel are fit with each other;

FIG. 12 is a cross-sectional view of an attachment portion of a hinge device on the left side of the expansion station;

FIG. 13 is a cross-sectional view of an attachment portion of a hinge device on the right side of the expansion station;

FIG. 14 is a partially fragmentary rear view an internal structure of a leg portion of the expansion station;

FIG. 15 is a cross-sectional view of the leg portion taken along the line 15—15 in FIG. 14;

FIG. 16 is a cross-sectional view of the leg portion taken along the line 16—16 in FIG. 14;

FIG. 17 is a front view of a structure of a portion where the engaging members are associated with the lock mechanism;

FIG. 18 is a perspective view of a portion where the engaging member and the link member on the right side are associated with each other;

FIG. 19 is an exploded perspective view showing a positional relationship between the engaging member and the plunger on the right side;

FIG. 20 is a front view showing a relationship between the engaging member and the lock mechanism on the right side in a state where the engaging member is located at the first position;

FIG. 21 is a front view showing a relationship between the engaging member and the lock mechanism on the right side in a state where the engaging member is located at the second position;

FIG. 22 is a cross-sectional view showing a positional relationship between the cam surface of the engaging member and the plunger on the right side in a state where the engaging member is located at the first position;

FIG. 23 is a cross-sectional view showing a positional relationship between the cam surface of the engaging member and the plunger on the right side in a state where the engaging member is located in the middle of the first and second positions;

FIG. 24 is a cross-sectional view showing a positional relationship between the cam surface of the engaging member and the plunger on the right side in a state where the engaging member is located at the second position;

FIG. 25 is a cross-sectional view showing a state in which the guide projection of the plunger moves over the cam surface of the engaging member on the right side;

FIG. 26 is a cross-sectional view showing a state in which the guide projection of the plunger enters the recess portion of the engaging member on the right side;

FIG. 27 is a cross-sectional view showing a plunger attachment structure;

FIG. 28 is a cross-sectional view showing a positional relationship between the stopper and the link member in a state where the stopper is located at the lock position;

FIG. 29 is a cross-sectional view showing a positional relationship between the stopper and the link member in a state where the stopper is located at the lock release position;

FIG. 30 is a cross-sectional view showing the electromagnetic solenoid attachment portion; and FIG. 31 is a block diagram showing a circuit in a state where the portable computer is connected to the expansion station.

FIGS. 32 to 34 are diagrams showing a second embodiment of the present invention, in which:

FIG. 32 is a perspective view showing a positional relationship between the pen cover and the cut portion of the stand in a state where the pen cover is opened;

FIG. 33 is a perspective view showing a positional relationship between the pen cover and the cut portion of the stand in a state where the pen cover is closed; and FIG. 34 is a cross-sectional view showing a positional relationship between the pen cover and the cut portion of the stand in a state where the pen cover is opened.

DETAILED DESCRIPTION OF THE PREFERRED EMBODIMENTS

A first embodiment of the present invention will be described with reference to FIGS. 1 to 31.

Figure 1:
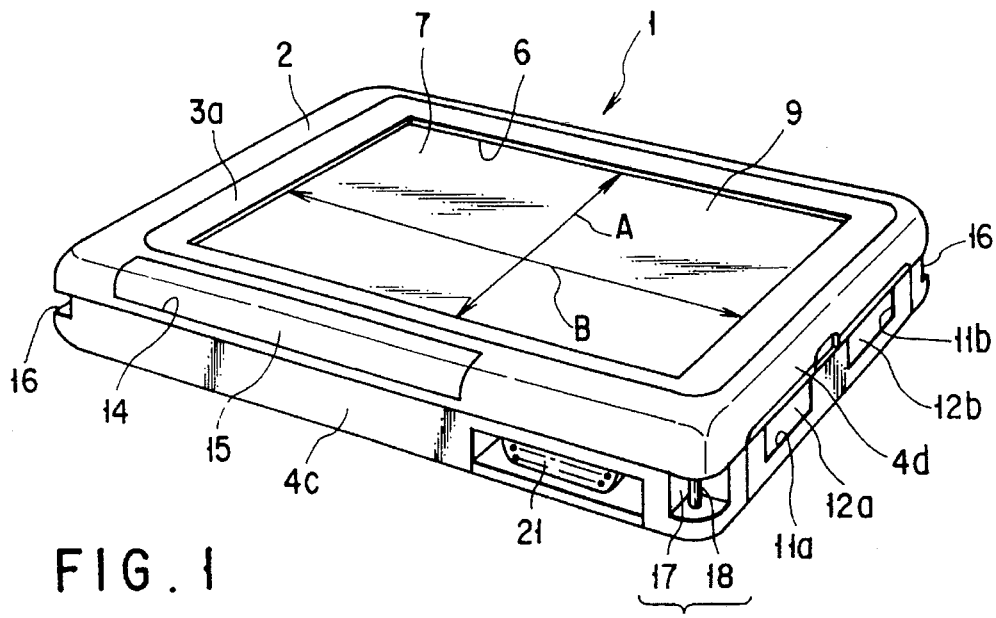
Figure 7:
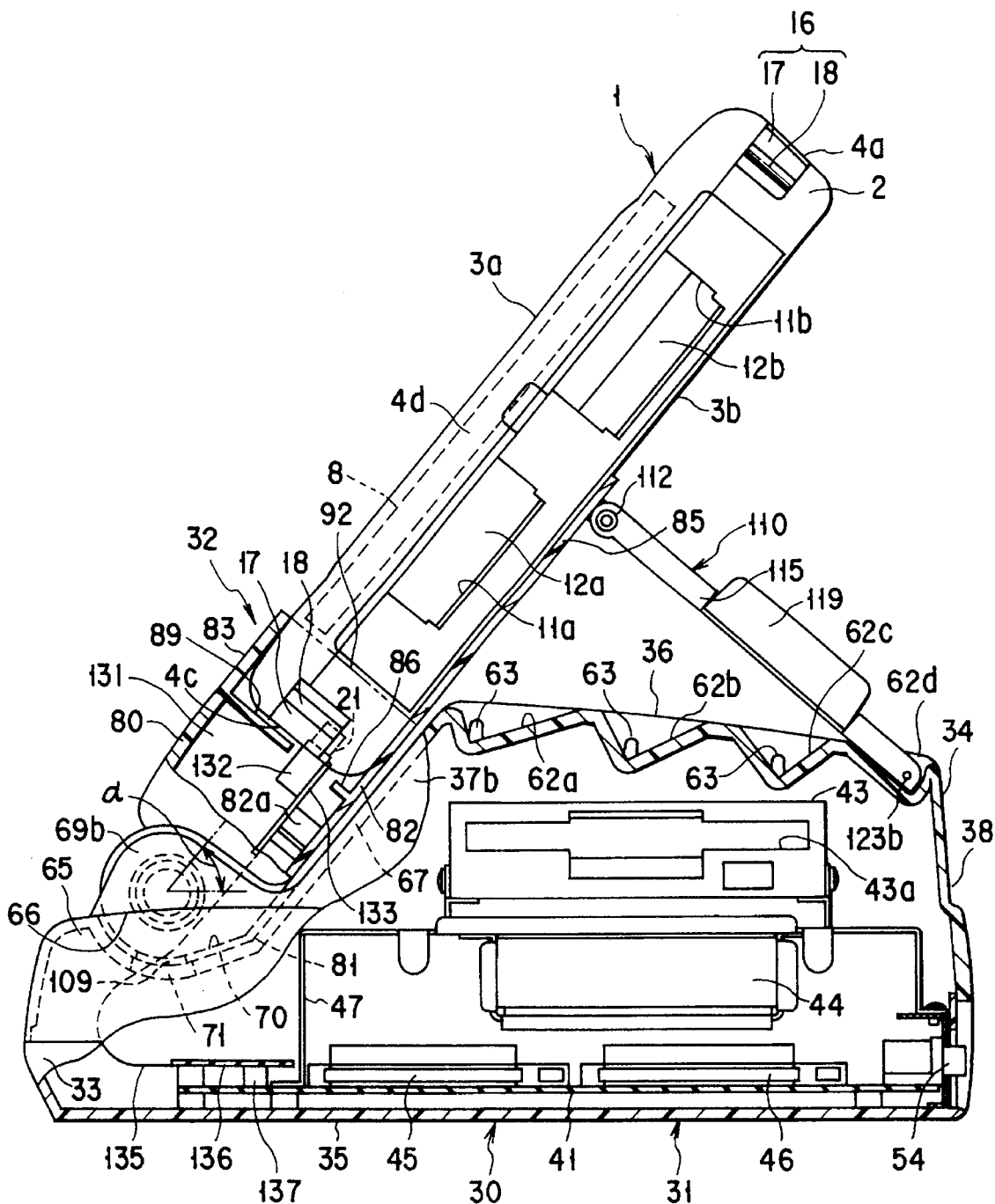

In FIG. 1, a reference numeral 1 denotes a portable computer employing a pen-input system. The computer 1 comprises a case 2 formed of synthetic resin. As shown in FIG. 7, the case 2 has an upper surface 3a and a bottom surface 3b, parallel to each other, and first to fourth side surfaces 4a to 4d connected to the upper and bottom surfaces 3a and 3b. The case 2 in its entirety has a flat, rectangular box shape.

The upper surface 3a of the case 2 has a rectangular opening 6. The opening 6 has a longitudinal axis A and a lateral axis B longer than the longitudinal axis A. The opening 6 is covered by a transparent protecting cover 7. The protecting cover 7 has a flat surface, which is connected to the upper surface 3a of the case 2 on substantially the same plane. An input device 8 of the touch panel system is held within the case 2. The input device 8, as disclosed in U.S. Pat. No. 4,723,836, Yoshio Kono, issued Feb. 9, 1988, comprises a pressure-sensitive tablet and a liquid crystal display panel. The tablet and the liquid crystal panel face to the protecting cover 7, so that various images are displayed on the surface of the protecting cover 7 through the liquid crystal display panel. Thus, the surface of the protecting cover 7 is a data input surface 9, which also serves as a display surface.

Figure 2:
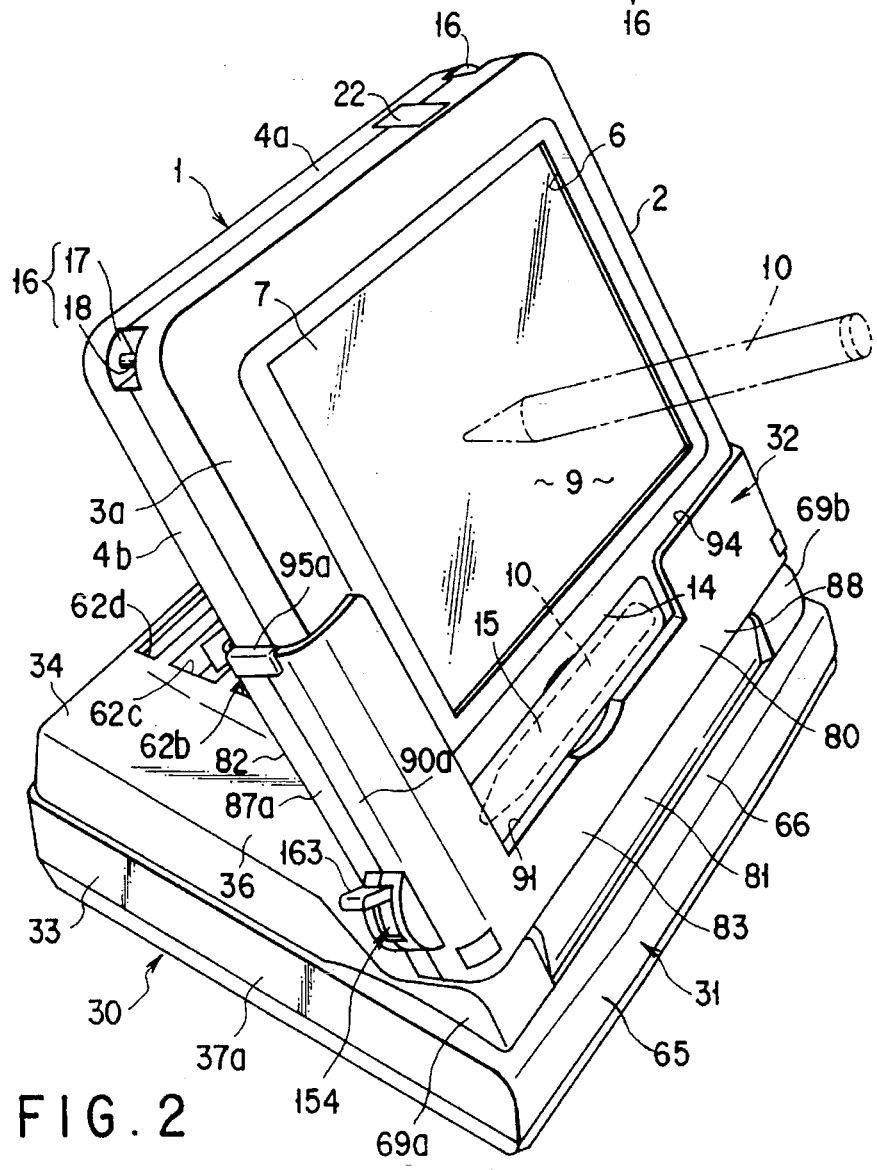

As shown in FIG. 2, the computer 1 includes a stylus pen 10. The stylus pen 10 is used to input information to the input device 8 of the computer 1 by handwriting. When the user presses the input surface 9 with the stylus pen 10, an input signal is generated in the tablet, so that desired information can be input to the computer 1.

The fourth side surface 4d of the case 2 is located at an end of the lateral axis B of the input surface 9. A pair of card inserting ports 11a and 11b are formed in the side surface 4d. An expansion card, such as a memory card, an interface card or an application card, is inserted through the card inserting port 11a or 11b into the computer 1. The card inserting ports 11a and 11b are opened or closed respectively by side covers 12a and 12b supported by the case 2.

Figure 30:
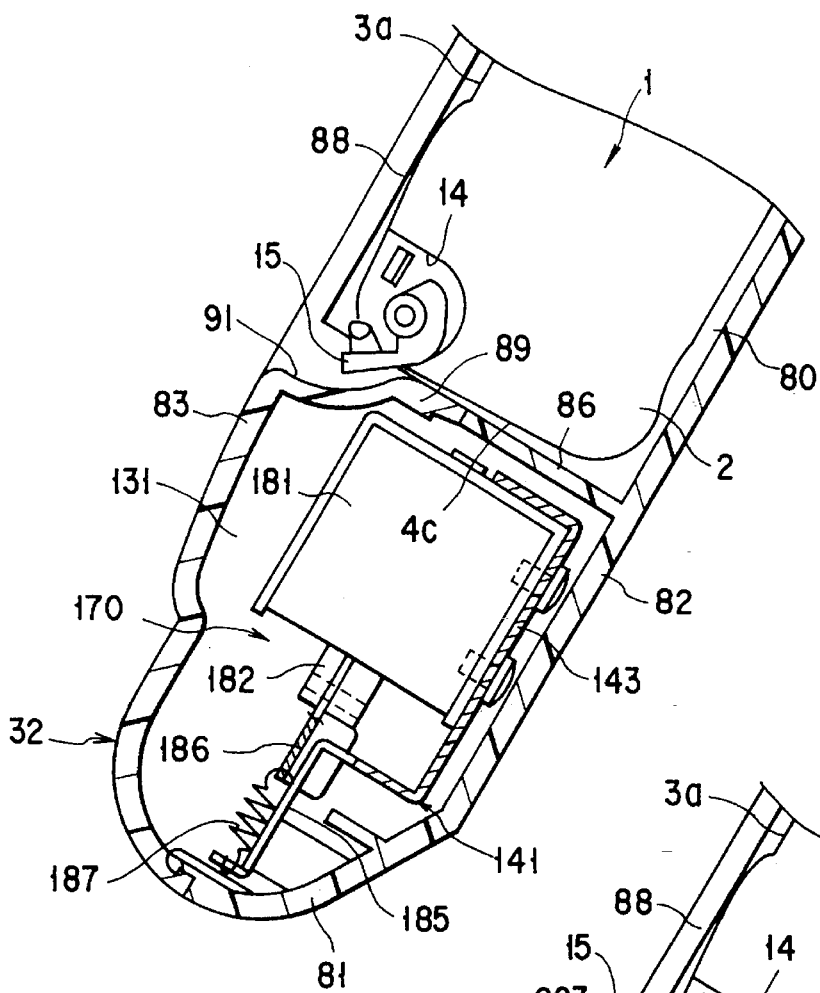

As shown in FIG. 1, the case 2 includes a pen storage portion 14, which removably stores the stylus pen 10. The pen storage portion 14, extending along the lateral axis B of the opening 6, is a recessed portion formed at a corner defined by the upper surface 3a and the third side surface 4c of the case 2, as shown in FIG. 30. The pen storage portion 14 has a pen cover 15. The pen cover 15 is supported by the case 2 so as to be rotatable between an open position, in which the pen storage portion 14 is opened, and a closed position, in,which the pen storage portion 14 is closed. When the pen cover 15 is rotated to the open position as shown in FIG. 30, it is retracted in a direction toward the third side surface 4c of the case 2, so that the pen storage portion 14 is opened to the outside of the case 2.

The case 2 has four strap attachment portions 16 to which neck straps (not shown) are attached. The strap attachment portions 16 are located at four corners defined by two adjacent surfaces of the first to fourth side surfaces 4a to 4d. Each strap attachment portion 16 has a recess 17 opened at the corner and a shaft 18 arranged in the recess 17. The shaft 18 extends in the thickness direction of the case 2.

As shown in FIGS 1 and 7, a first connector 21 is arranged in the third side surface 4c of the case 2. The first connector 21 is adjacent to the pen storage portion 14. The first connector 21 is electrically connected to the input device 8 through a circuit board (not shown).

A push type power switch 22 is located on the first side surface 4a of the case 2. The power switch 22, for turning on and off the power supply of the computer 1, is electrically connected to the first connector 21 through the circuit board. The power switch 22 is located on the opposite side of the pen storage portion 14 and the first connector 21.

Figure 31:
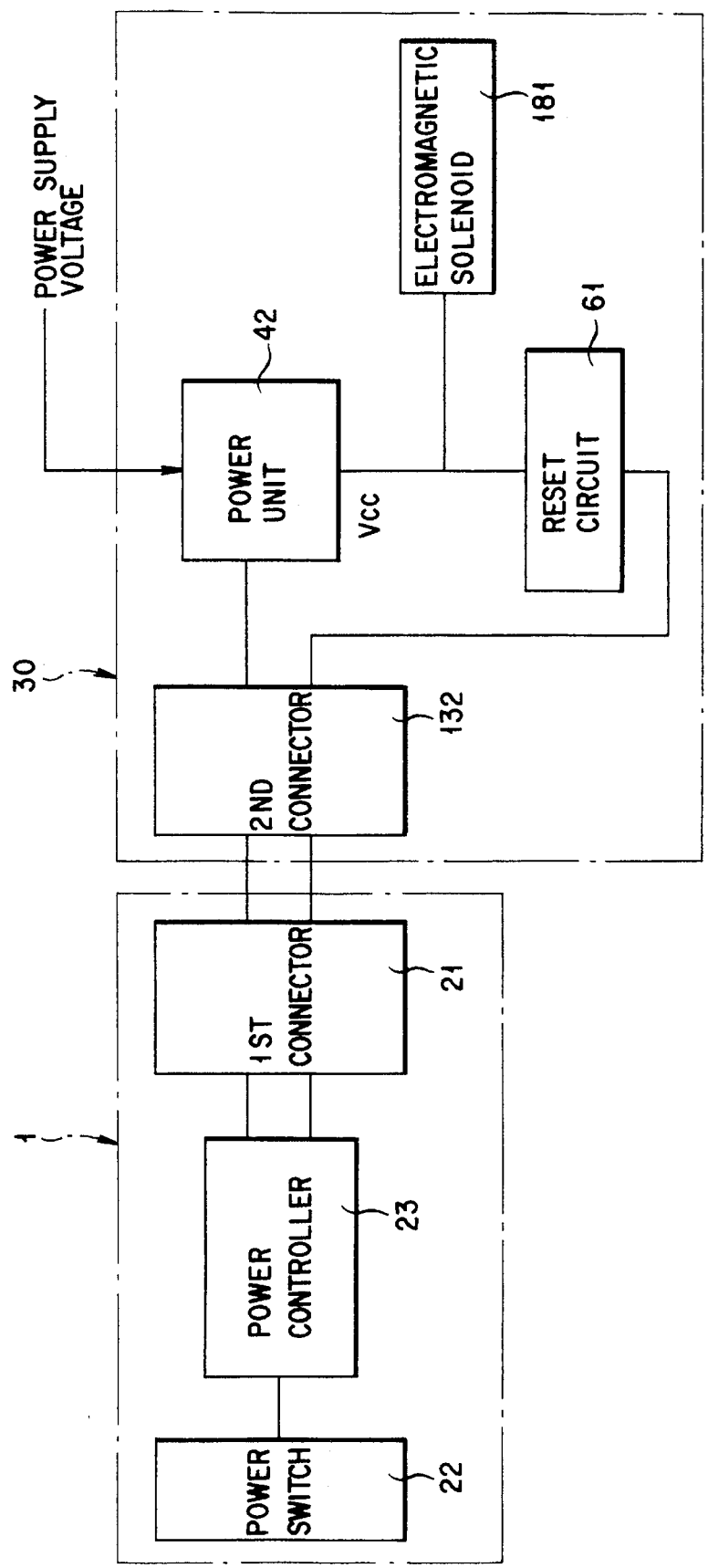

As shown in FIG. 31, the computer 1 includes a power controller 23. The power controller 23 is connected to the power switch 22, and outputs a signal to the first connector 21, when the power switch 22 is turned on.

To expand the function of the aforementioned computer 1, an expansion station 30 as shown in FIGS. 2 to 6 is used. The expansion station 30 includes a housing 31 (main body) and a stand 32 supported by the housing 31. The housing 31 and the stand 32 are formed of synthetic resin material. The housing 31 has a rectangular box shape, which is much greater than the computer 1. The housing 31 has a lower housing 33 and an upper housing 34. The inner surfaces of the lower and upper housings 33 and 34 are coated with conductive plating layers to prevent electromagnetic wave obstruction.

Figure 8:
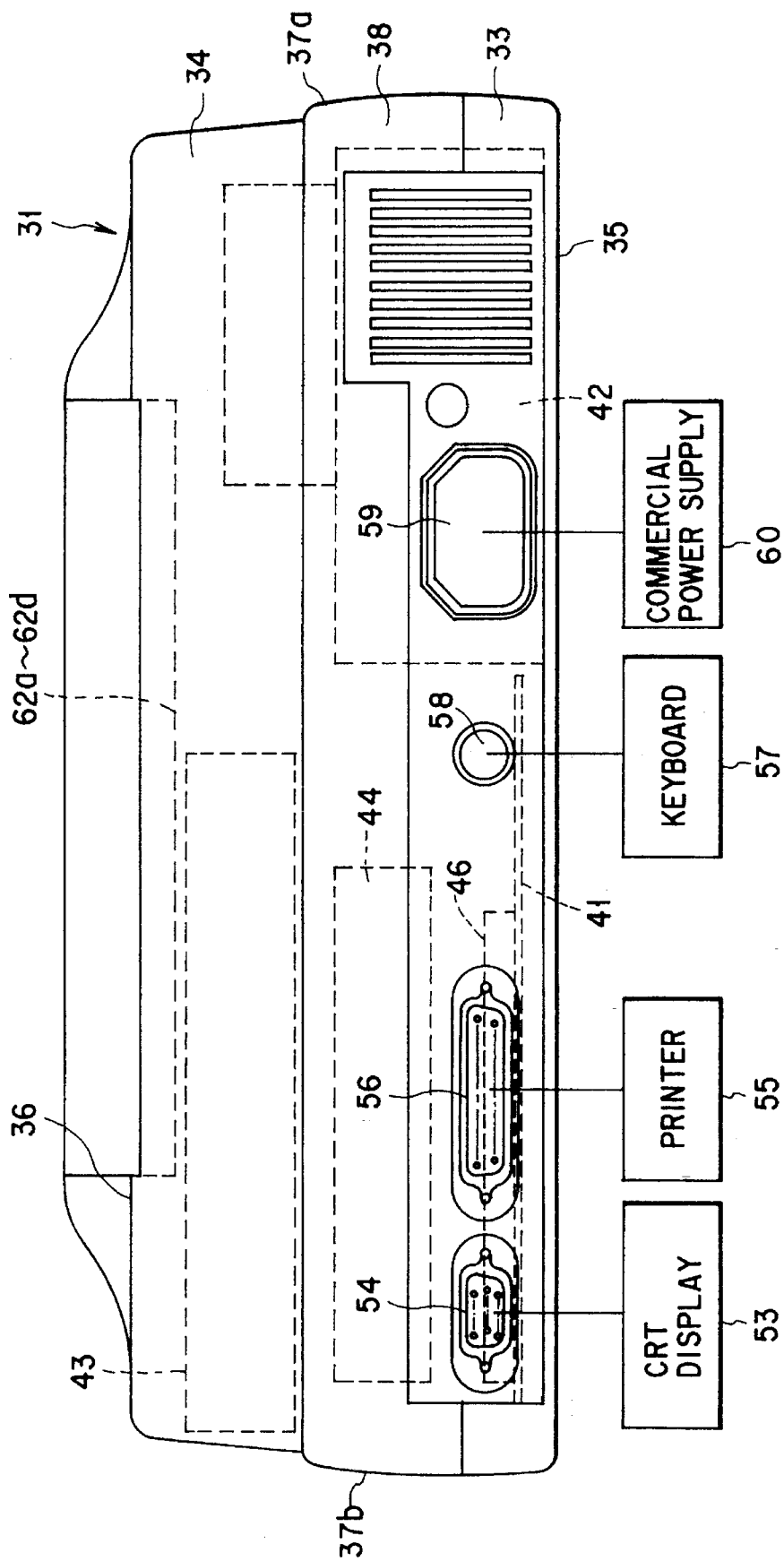

As shown in FIGS. 7 and 8, the housing 31 has a flat bottom wall 35, an upper wall opposing to the bottom wall 35, left and right side walls 37a and 37b, and a rear wall 38. The housing 31 contains a circuit board 41, a power supply unit 42, and an expanding apparatus for expanding the function of the computer 1. A floppy disk drive 43 and a hard disk drive 44 are used as the expanding apparatus.

The circuit board 41 is supported on the bottom wall 35 of the housing 31. A pair of card connectors 45 and 46 are mounted on the upper surface of the circuit board 41. The card connectors 45 and 46, to which PCMCIA (Personal Computer Memory Card International Association) cards can be removably connected, are arranged, on the upper surface of the circuit board 41, side by side in the depth direction of the housing 31.

Figure 3:
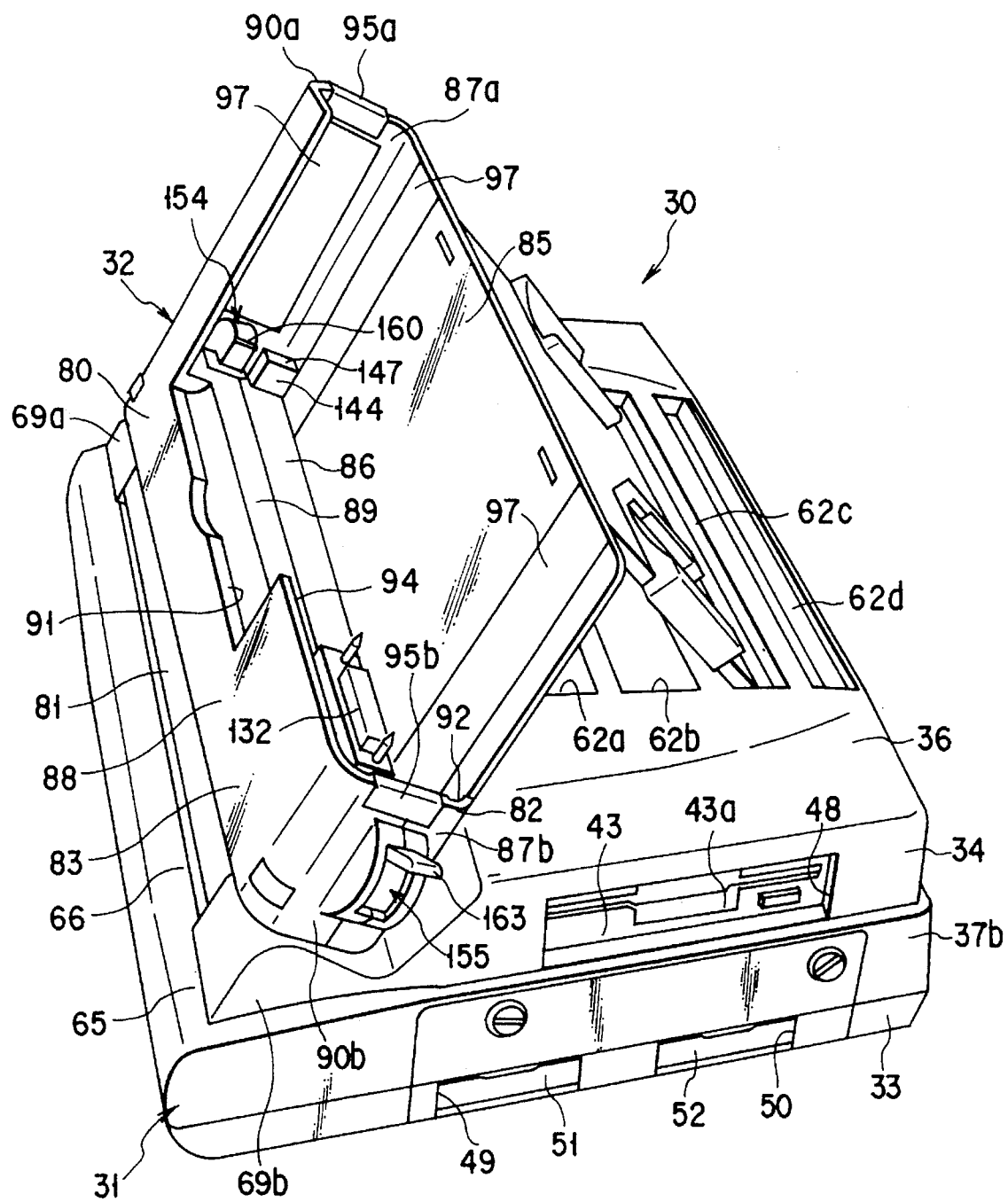

A metal bracket 47 is attached to the upper surface of the circuit board 41. The bracket 47 supports the floppy disk drive 43 and the hard disk drive 44. The floppy disk drive 43 is arranged above the hard disk drive 44, above the card connectors 45 and 46. The floppy disk drive 43 and the hard disk drive 44 are connected to the circuit board 41 through cables. As shown in FIG. 3, the right side wall 37b has an opening 48 for exposing a floppy disk inserting port 43a of the floppy disk drive 43 and a pair of card slots 49 and 50 facing the card connectors 45 and 46. The card slots 49 and 50 are opened and closed by card covers 51 and 52 supported by the housing 31.

As shown in FIG. 8, mounted on the circuit board 41 are an RGB connector 54 to be connected to a CRT display 53, a parallel port 56 to be connected to a printer 55, and a keyboard connector 58 to be connected to an external keyboard 57. The RGB connector 54, the parallel port 56 and the keyboard connector 58 are arranged on the rear wall 38 of the housing 31.

The power supply unit 42 is connected to the circuit board 41 through a cable. The power supply unit 42 has a power supply receptacle 59 through which power is input. The power supply receptacle 59 is arranged on the rear wall 38 of the housing 31. A plug connected to a commercial power supply 50 is inserted in the power supply receptacle 59. When the power supply unit 42 is turned on, a power supply voltage (VCC) is generated and a reset signal is output from a reset circuit 61, as shown in FIG. 31.

Figure 6:
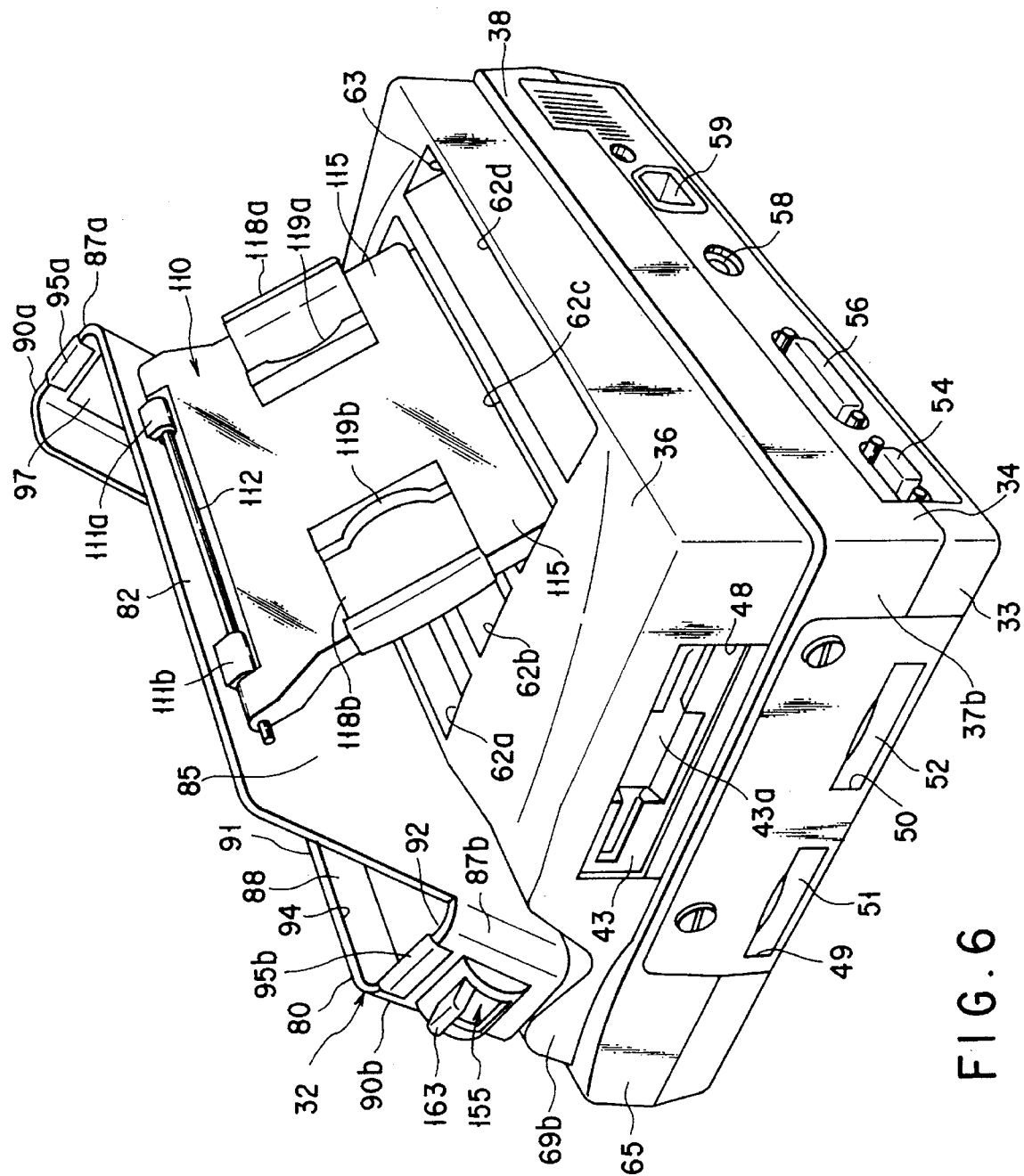

As shown in FIGS. 6 and 7, four engaging grooves 62a to 62d are formed in the upper wall 36 of the housing 31. The engaging grooves 62a to 62d, each extending in the width direction of the housing 31, are arranged alongside at intervals. Engaging holes 63 are formed in both ends of each of the engaging grooves 62a to 62d.

Figure 4:
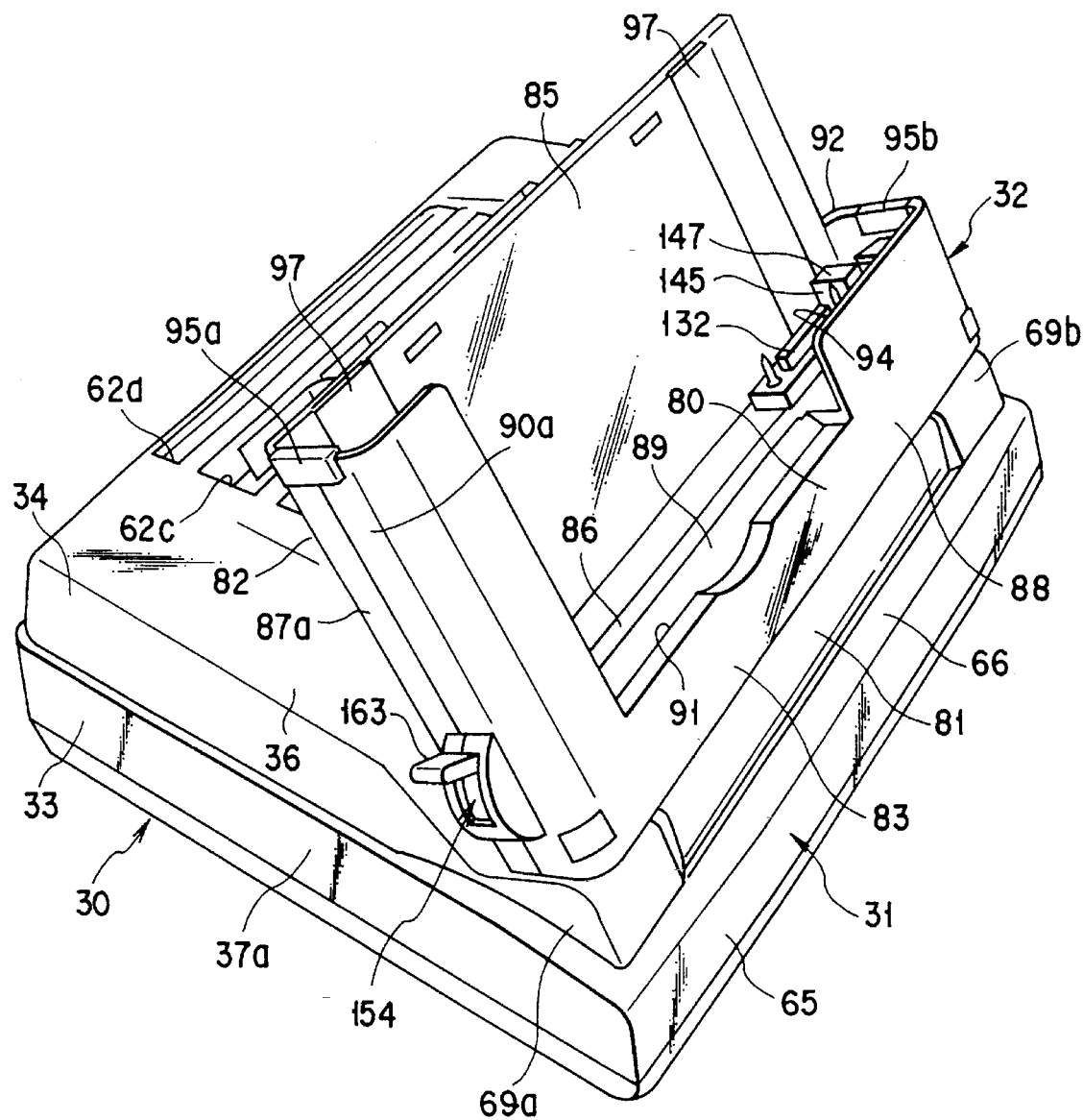

As shown in FIGS. 3 and 4, the housing 31 has a stand supporting portion 65 formed integrally therewith. The stand supporting portion 65, located at a front end portion of the housing 31, has a substantially horizontal supporting wall 66 formed on the overall width of the housing 31. As shown in FIG. 7, the supporting wall 66 is located below the upper wall 36 of the housing 31. The supporting wall 66 and the upper wall 36 are connected to each other via a front wall 67. The front wall 67 is inclined upward in a direction from the supporting wall 66 to the upper wall 36. The left and right ends of the front wall 67 are connected to the side walls 37a and 37b.

Figure 12:
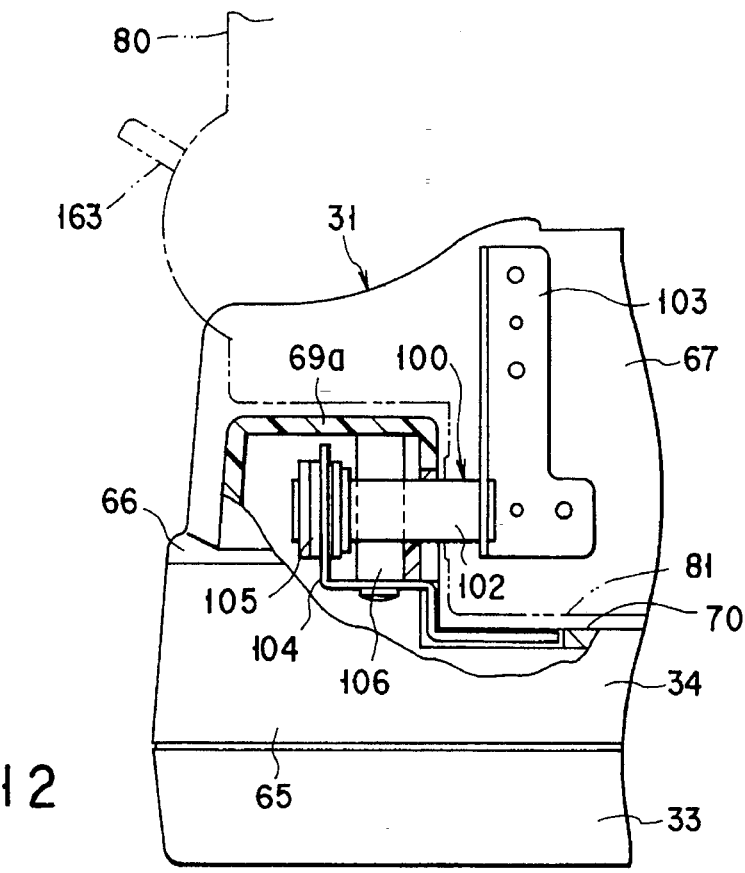
Figure 13:
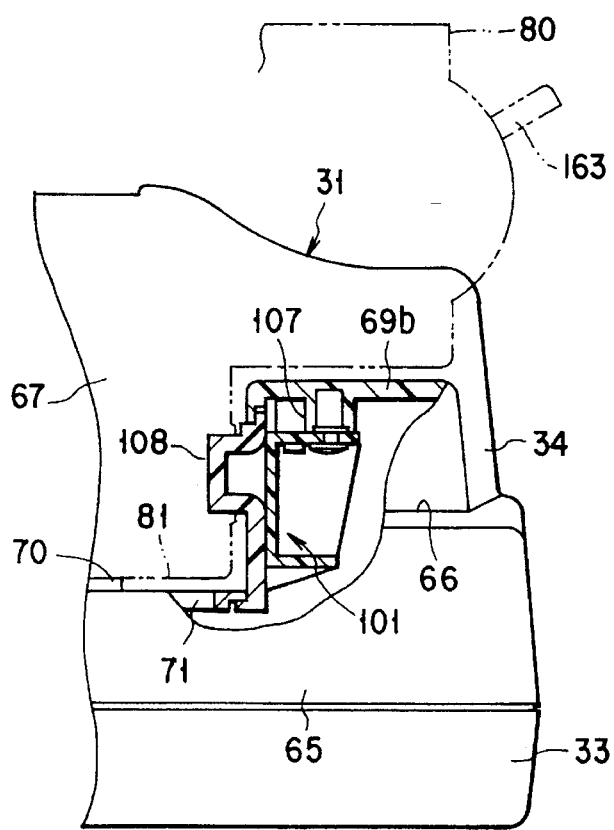

A pair of supporting projections 69a and 69b are arranged on the upper surface of the supporting wall 65. The supporting projections 69a and 69b are spaced apart from each other in the width direction of the stand supporting portion 65. As shown in FIGS. 12 and 13, the supporting projections 69a and 69b have a hollow structure and range to the interior of the stand supporting portion 65. Further, as shown in FIG. 7, the supporting wall 66 has a recess 70, which extends between the supporting projections 69a and 69b. A cable inserting port 71 is formed in the bottom of the recess 70 and ranges to the interior of the stand supporting portion 65.

As shown in FIGS. 2 to 6, the stand 32 has a holding portion 80 in which the case 2 of the computer 1 is removably inserted. The holding portion 80, for holding the computer 1 in a stand-up state, has a connecting portion 81, which is inserted between the supporting projections 69a and 69b of the stand support portion 65. The holding portion 80 including the connecting portion 81 has a rear panel 82 and a front panel 83. The rear panel 82 has a supporting wall 85 for supporting the bottom surface 3b of the case 2, and left and right side walls 87a and 87b which are to face the second and fourth side surfaces 4b and 4d of the covering 2. The front panel 83 has a front wall 88 for covering the upper surface 3a of the case 2, and left and right side walls 90a and 90b which are to face the second and fourth side surfaces 4b and 4d of the case 2. A cut portion 91 is formed in the front wall 88 to expose the input surface 9 and the pen storage portion 14.

Figure 9:
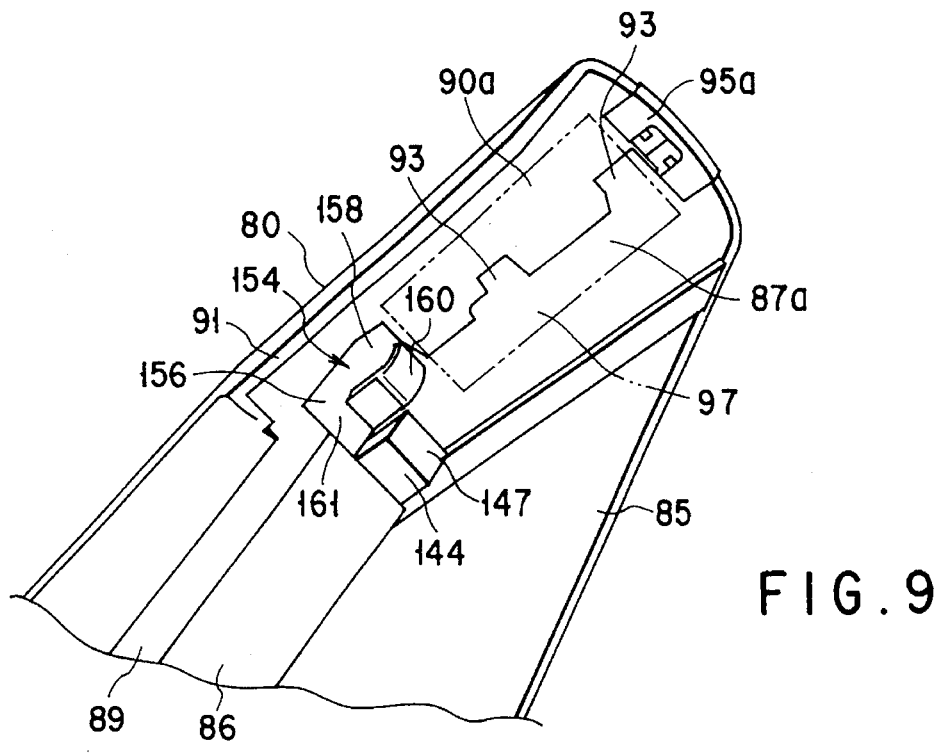
Figures 10, 11:
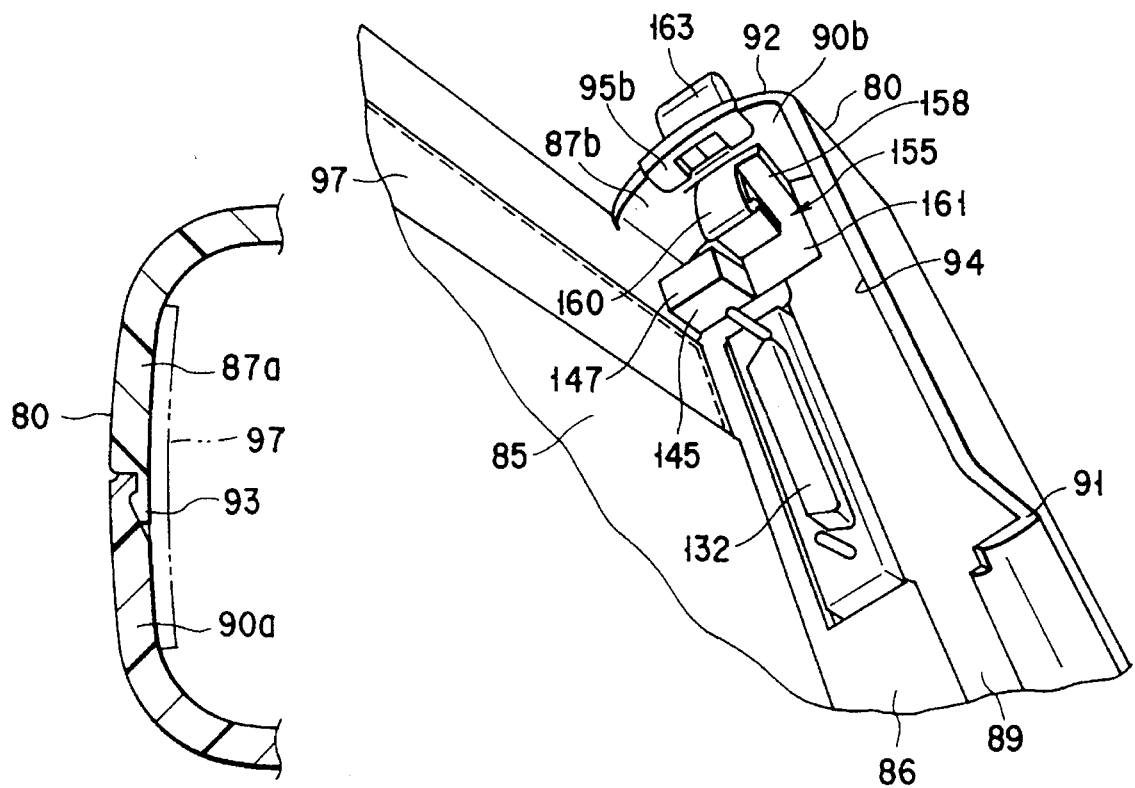

As shown in FIGS. 9 and 10, the edge portions of the side walls 87a and 87b are respectively fit with those of the side walls 90a and 90b, thereby forming left and right sides of the holding portion 80. Engaging claws 93, as shown in FIG. 11, are formed integral with left side walls 87a and 90a, so that they can engage with the inner surfaces of the opposing side walls 90a and 87a. The side walls 87b and 90b, forming the right side of the holding portion 80, has a cut portion 92 at a position corresponding to the card inserting ports 11a and 11b of the case 2, so that the card inserting ports 11a and 11b are exposed to the outside of the holding portion 80 through the cut portion 92.

The rear panel 82 and the front panel 83, in cooperation with each other, form an opening 94 in which the case 2 is inserted. The top edges of the side walls 87a, 87b, 90a and 90b are connected to an edge of the opening 94. Synthetic resin clips 95a and 95b are attached to the edge of the opening 94. The clips 95a and 95b are formed across and engaged with a set of the side walls 87a and 90b and a set of the side walls 87b and 90b, respectively. For this reason, the side walls 87a and 90a are coupled tight to each other by the claw 93 and the clip 95a, and the side walls 87b and 90b are coupled tight to each other by the clip 95b.

Figure 5:
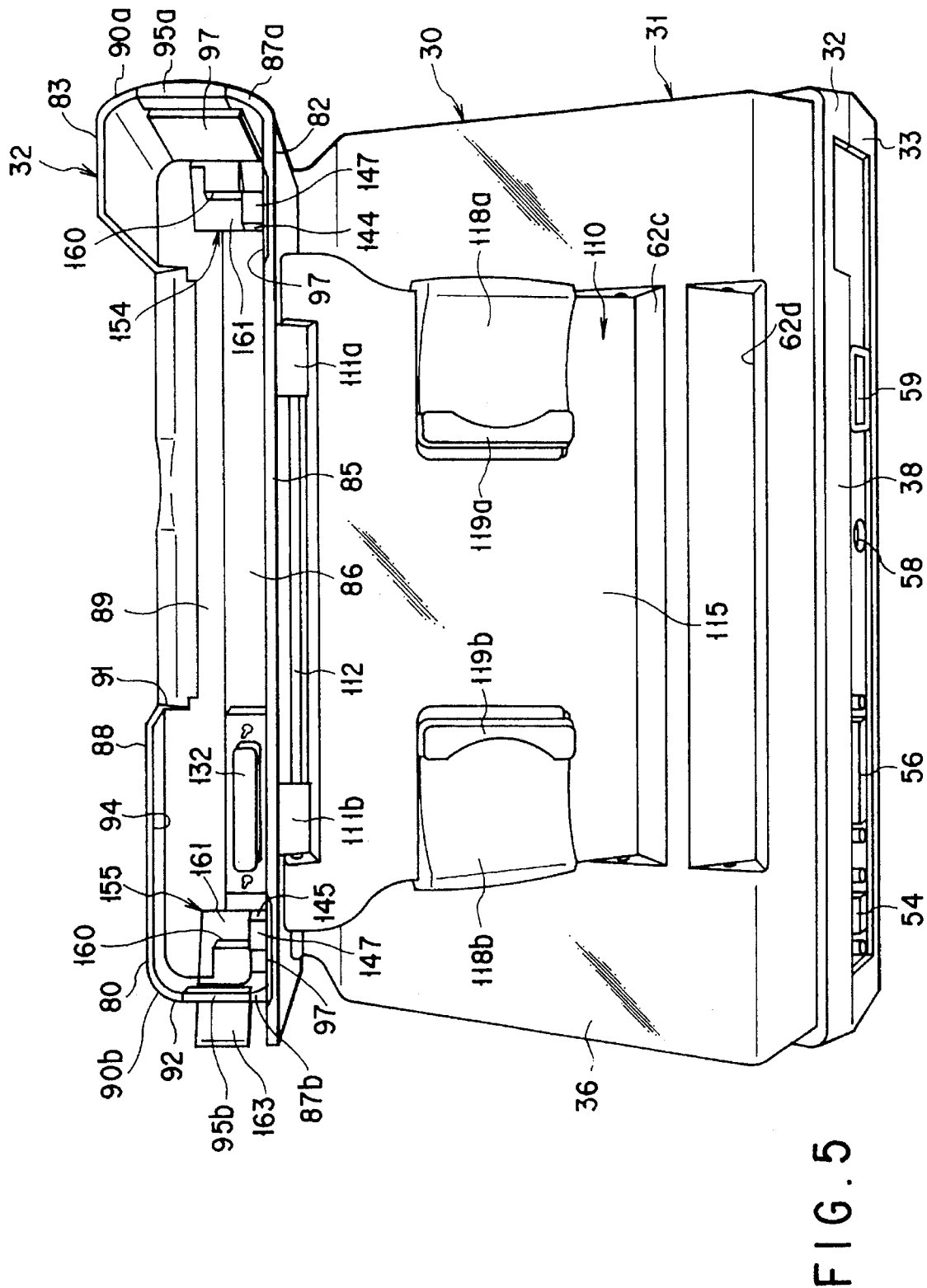

As shown in FIGS. 5, 9 and 10, the rear panel 82 and the front panel 83 have end walls 86 and 89 which fit with each other. The end walls 86 and 89, opposite to the opening 94, form a bottom of the holding portion 80. The end wall 89 of the front panel 83 ranges to the cut portion 91. As shown in FIGS. 3 and 5, smoothing members 97 are adhered to the supporting wall 85 of the rear panel 82, and the side walls 87a and 90a forming the left side of the holding portion 80. The smoothing members 97 are formed of, for example, sheet material of high density polyethylene. When the case 2 of the computer 1 is inserted in the holding portion 80, the smoothing members 97 are slidably brought into contact with the bottom surface 3b and the second side surface 4b of the case 2, thereby suppressing the friction resistance between the case 2 and the holding portion 80.

As shown in FIGS. 12 and 13, the connecting portion 81 of the holding portion 80 is connected to the supporting projections 69a and 69b of the stand support portion 65 via a pair of left and right hinge devices 100 and 101. The left hinge device 100 has a hinge shaft 102, a first bracket 103 fixed to one end of the hinge shaft 102, a second bracket 104 rotatably connected to the other end of the hinge shaft 102, and a ring-shaped spring member 105 for restricting free rotation of the second bracket 104 with respect to the hinge shaft 102. The hinge shaft 102 ranges between the left supporting projection 69a and the connecting portion 81. The first bracket 103 at the one end of the hinge shaft 102 is fixed to the rear panel 82 with a screw. The second bracket 104 at the other end of the hinge shaft 102 is fixed to a boss portion 106 on the inner surface of the supporting projection 69a with a screw.

The right hinge device 101 is fixed to a boss portion 107 on the inner surface of the right supporting projection 69b. The hinge device 101 has a shaft portion 108 formed of synthetic resin. The shaft portion 108 is rotatably engaged with the right surface of the connecting portion 81 through the side of the supporting projection 69b. The hinge shaft 102 and the shaft portion 108 extend horizontally and are coaxially arranged. Therefore, the holding portion 80 is supported by the stand support portion 65 so as to be rotatable back and forth on the hinge shaft 102 and the shaft portion 108. The lower end portion of the connecting portion 81, which ranges to the holding portion 80, is located inside the recess 70. A communicating port 109 (FIG. 7) is formed in the lower end portion of the connecting portion 81. The communicating port 109 communicates with the cable inserting port 71.

As shown in FIGS. 6 and 7, the stand 32 has a leg portion 110. The leg portion 110, for regulating the stand angle α of the holding portion 80, is shaped as a flat hollow box. One end of the leg portion 110 is pivotably supported by boss portions 111a and 111b formed on an upper portion of the rear panel 82 via a pivot shaft 112. The other end of the leg portion 110 is selectively inserted in one of the engaging grooves 62a to 62d of the housing 31, thereby holding the stand 32 in a stand-up state. In this case, the stand angle α of the stand 32 can be changed in four stages in accordance with selected one the engaging grooves 62a to 62d in which the leg portion 110 is inserted.

Figures 14, 15:
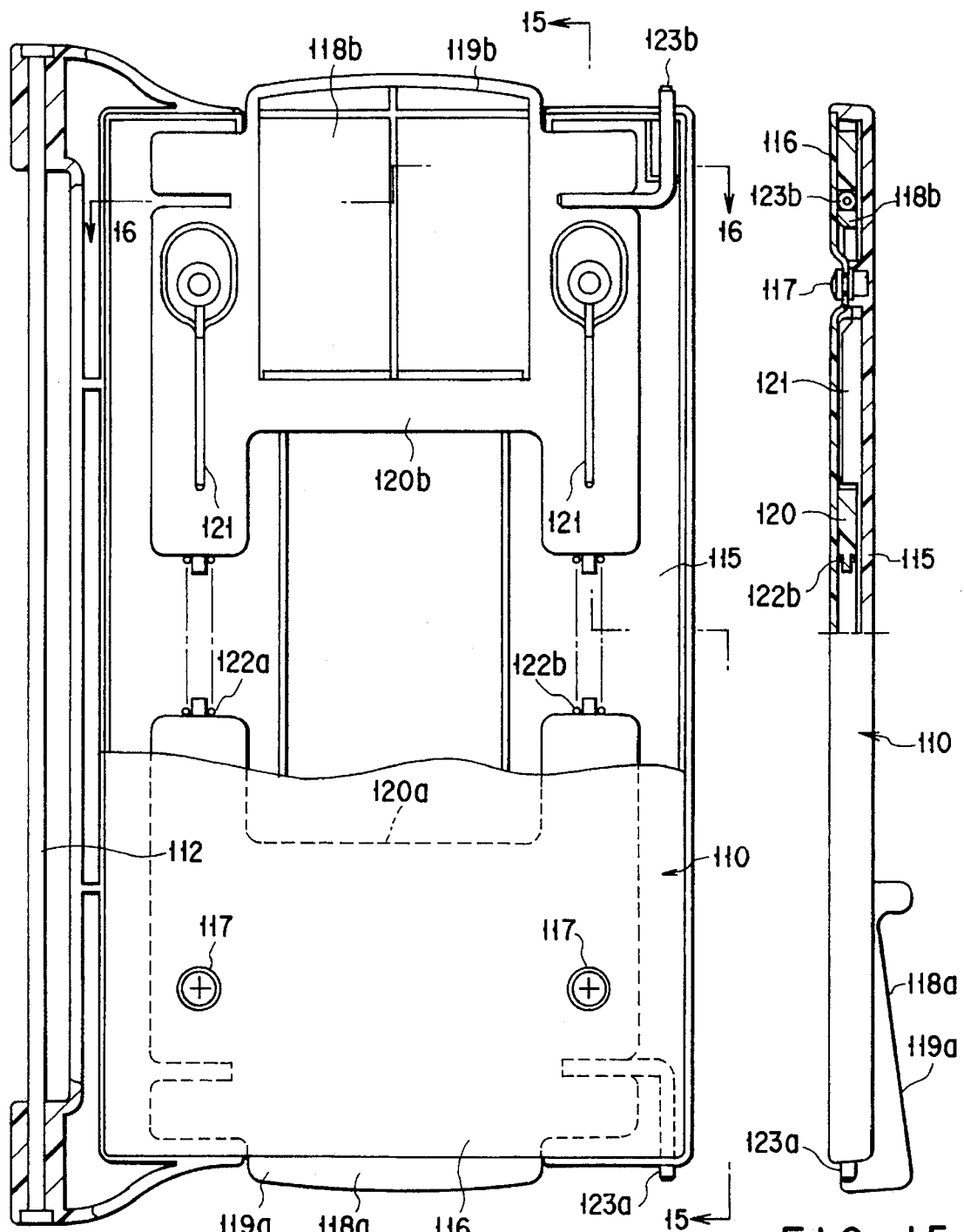
Figure 16:

As shown in FIGS. 14 and 15, the leg portion 110 has a flat leg body 115, and a cover plate 116. The cover plate 116 is fixed to the leg body 115 with screws 117. The leg portion 110 includes a pair of lock levers 118a and 118b. The lock levers 118a and 118b are located at the one end of the leg portion 110. The lock levers 118a and 118b integrally comprise finger push portions 119a and 119b exposed to the outside of the leg portion 110 and slide guide portions 120a and 120b sandwiched between the leg body 115 and the cover plate 116. The slide guide portions 120a and 120b are slidable leftward and rightward along a guide rail 121 formed on the inner surface of the leg body 115. The slide guide portions 120a and 120b are biased by compression coil springs 122a and 122b in directions in which they are removed from each other. L-shaped lock pins 123a and 123b are attached to the slide guide portions 120a and 120b. The lock pins 123a and 123b are located at the other end of the leg portion 110.

The lock levers 118a and 118b are supported by the leg portion 110 so as to be slidable between a lock position in which the lock pins 123a and 123b project outward from the leg portion 110 and a lock release position in which the lock pins 123a and 123b are retracted inward in the leg portion 110. The lock levers 118a and 118b are normally supported at the lock position by the compression coil springs 122a and 122b.

For this reason, to insert the leg portion 110 in one of the engaging grooves 62a to 62d, the finger push portions 119a and 119b are first pressed in directions in which they get close to each other, so that the lock levers 118a and 118b are slid from the lock position to the lock release position. With this slide, the lock pins 123a and 123b are retracted inside the leg portion 110. In this state, the other end of the leg portion 110 is inserted in any one of the engaging grooves 62a to 62d and the finger push portions 119a and 119b are released. As a result, the lock levers 118a and 118b are forced to slide to the lock position, so that the lock pins 123a and 123b are projected from the leg portion 110. Accordingly, the lock pins 123a and 123b are engaged with engaging holes 63 in the one of the engaging grooves 62a to 62d. With this engagement, the leg portion 110 is unremovably held in the one of the engaging grooves 62a to 62d, thereby maintaining the stand-up state of the stand 32.

Figure 17:
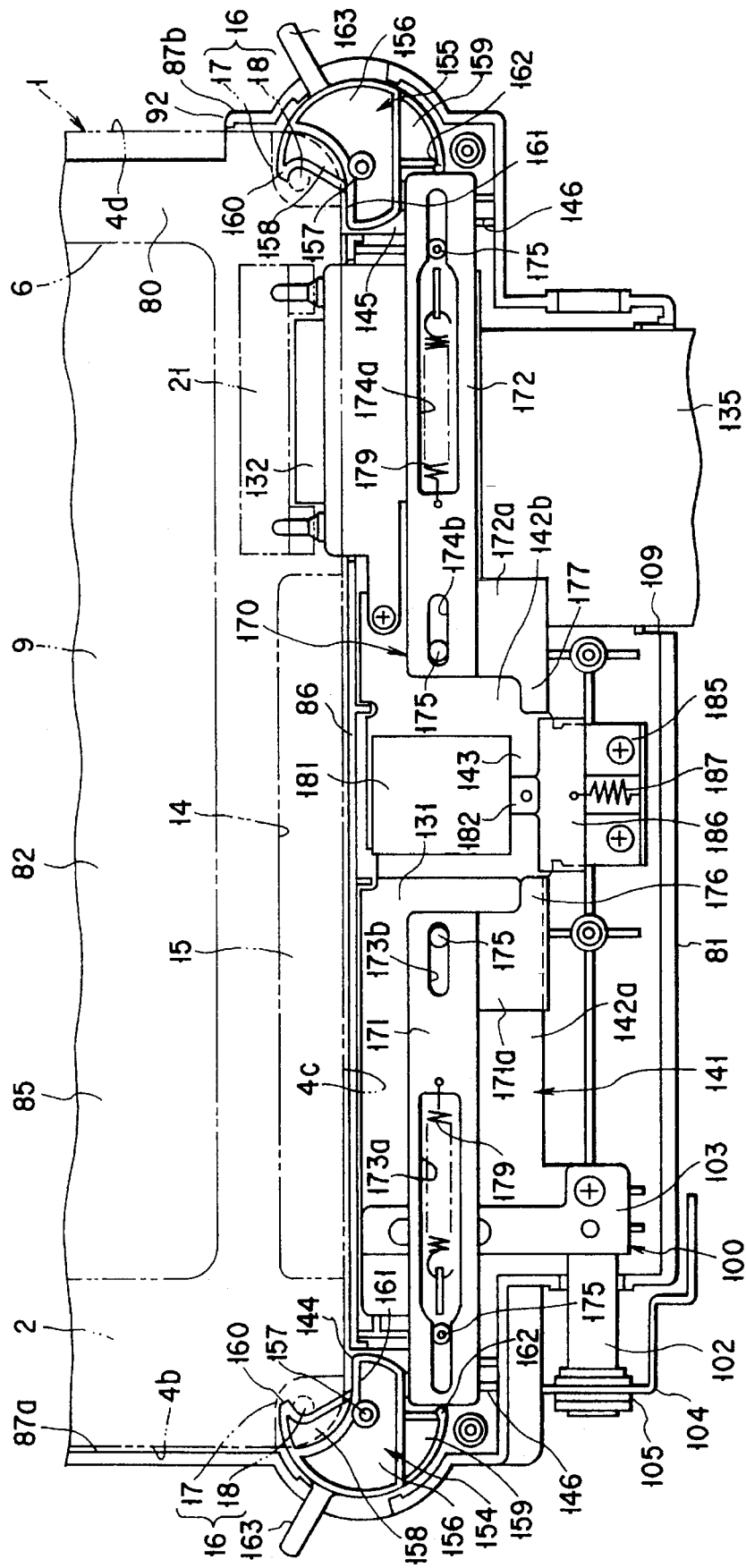

As shown in FIGS. 7 and 17, a storage chamber 131, partitioned by the end walls 86 and 89, is formed in a lower portion of the holding portion 80. The storage chamber 131 communicates with the internal space of the connecting portion 81. The storage chamber 131 contains a second connector 132. The second connector 132 has a connector substrate 133, which is fixed to a boss portion 82a of the rear panel 82 with a screw. The second connector 132 is exposed to the bottom surface of the holding portion 80 through the end walls 86 and 89, so that the first connector 21 of the computer 1 can be removably connected to the second connector 132.

The connector substrate 133 is connected to a flexible wiring substrate 135. The wiring substrate 135 is inserted in the housing 31 through the communicating port 109 and the cable inserting port 71. The distal end of the wiring substrate 135 is connected to a relay substrate 136. The relay substrate 136 is connected to the circuit board 41 via a stacking connector 137. The second connector 132 is thus electrically connected to the floppy disk drive 43 and the hard disk drive 44. The second connector 132 is also electrically connected to the power supply unit 42 via the reset circuit 61.

Figure 18:
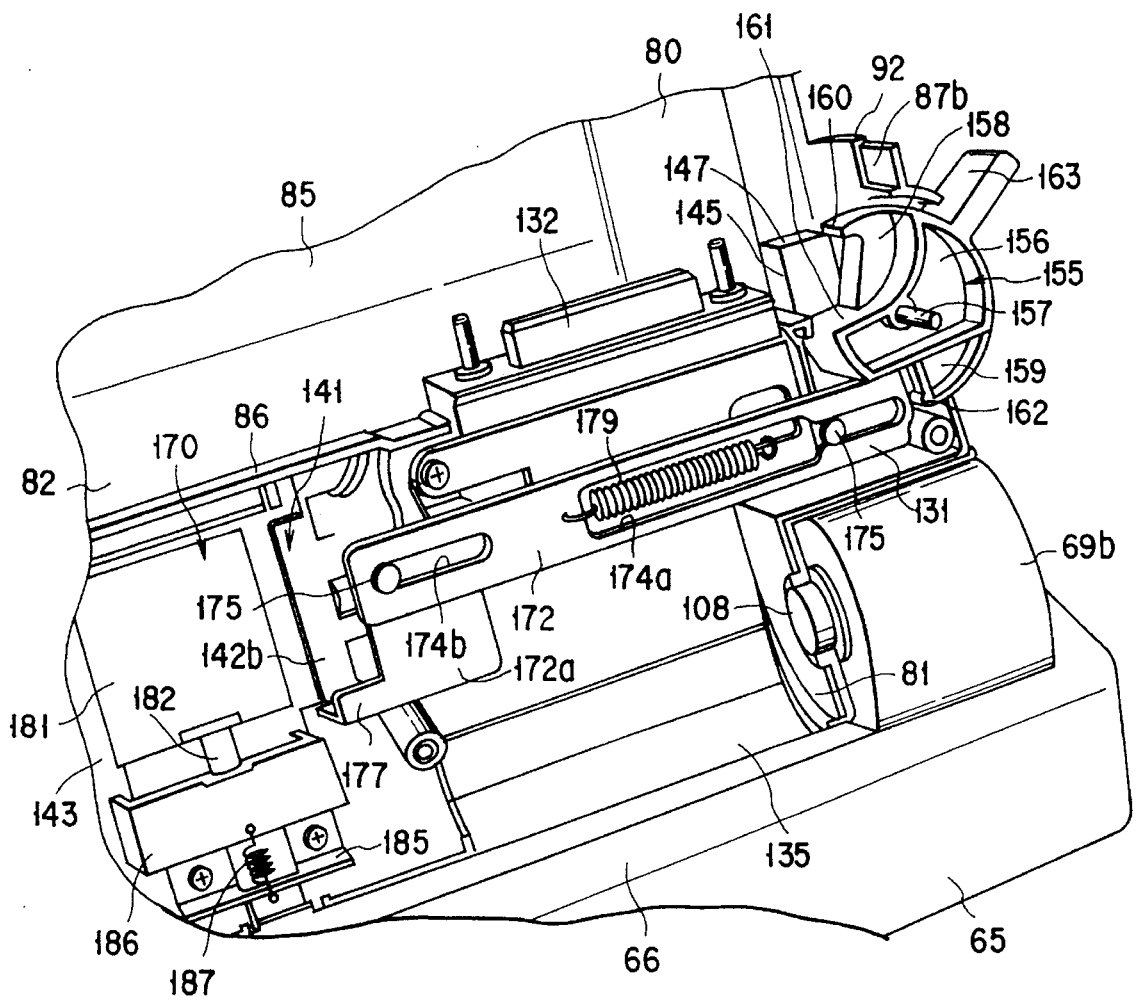

As shown in FIGS. 17 and 18, the storage chamber 131 contains a middle frame 141 made of metal. The middle frame 141 has a pair of link supporting portions 142a and 142b and a solenoid supporting portion 143. The link supporting portions 142a and 142b are arranged apart in the width direction of the holding portion 80. The solenoid supporting portion 143 is located between the link supporting portions 142a and 142b. The middle frame 141 is fixed to the boss portion 82a of the rear panel 82 with a screw.

A pair of left and right plungers 144 and 145, for receiving the case 2 of the computer 1, are arranged on the bottom of the holding portion 80. The plungers 144 and 145 are arranged apart in the width direction of the holding portion 80 and supported by the rear panel 82 of the holding portion 80 so as to be movable upward and downward.

Figure 19:
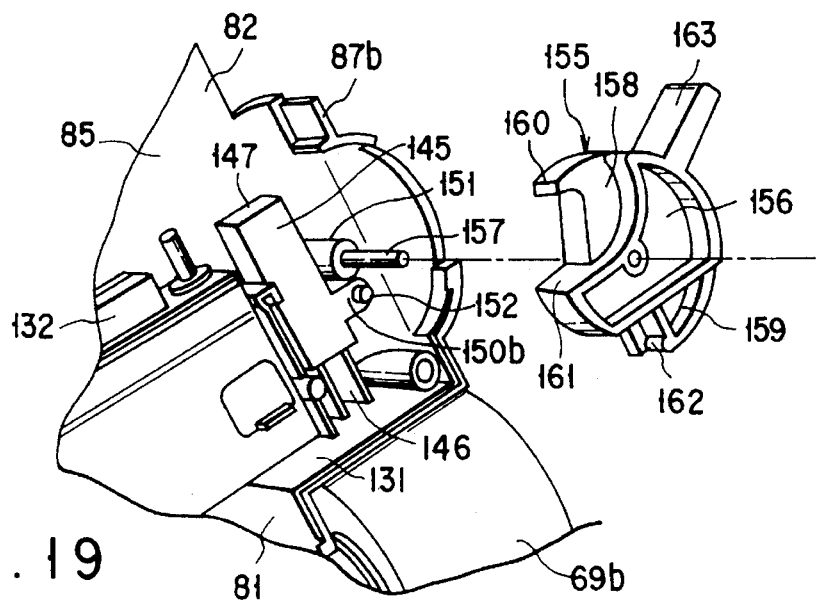
Figure 27:
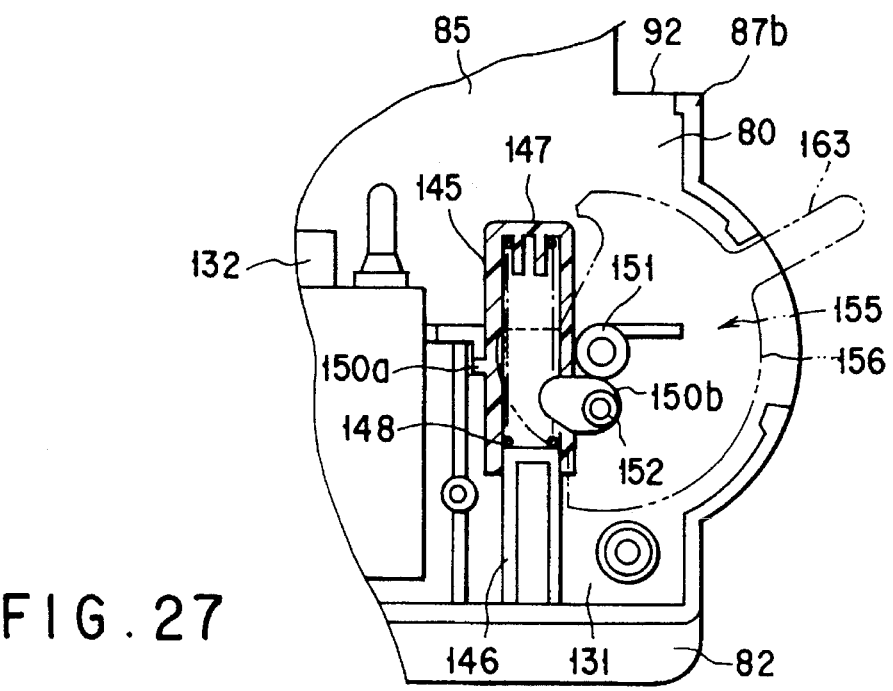

The structure for supporting the right plunger 145 will be described below as a representative. As shown in FIGS. 19 and 27, a guide wall 146 is formed integral with the supporting wall 85 of the rear panel 82. The guide wall 146 extends vertically along a direction in which the computer 1 is inserted. The plunger 145 is engaged with the guide wall 146 so as to be slidable in vertical directions. An upper end portion of the plunger 145 is exposed to the holding portion 80 through the end wall 86. The upper surface of the plunger 145 is formed as a flat pressing surface 147, to which the third side surface 4c of the case 2 is pressed. The plunger 145 is biased upward by a compression coil spring 148. Due to this compression, the pressing surface 147 of the plunger 145 is projected above the end walls 86 and 89, when the computer 1 is not inserted in the holding portion 80.

As shown in FIG. 27, the plunger 145 has a pair of stoppers 150a and 150b. The stoppers 150a and 150b, for restricting the upward movement of the plunger 145, abuts on the end wall 86 and a boss portion 151 connected to the end wall 86. One stopper 150b has a front surface which faces the front panel 83 and on which a cylindrical guide projection 152 is formed.

As shown in FIG. 17, a pair of left and right engaging members 154 and 155 are attached to the holding portion 80. The engaging members 154 and 155 are arranged between the front panel 83 and the pair of plungers 144 and 145 and apart from each other in the width direction of the holding portion 80. Since the left and right engaging members 154 and 155 have the same structure, the right engaging member 155 will be described as a representative. As shown in FIGS. 18 and 19, the engaging member 155 has a substantially circular main body 156. The main body 156 is pivotably supported by the boss portion 151 of the rear panel 82 via a pivot shaft 157. The main body 156 has a first portion 158 exposed to the interior of the holding portion 80 and a second portion 159 exposed to the interior of the storage chamber 131. The first portion 158 has a claw 160 and a push portion 161 located under the claw 160. When the computer 1 is inserted in the holding portion 80, the claw 160 enters the recess 17 of the strap attachment portion 16 and removably engaged with the shaft 18 in the recess 17. The push portion 161 faces the third side surface 4c of the computer 1, when the computer is inserted in the holding portion 80. The push portion 161 is arranged adjacent to the second connector 132.

Figure 20:
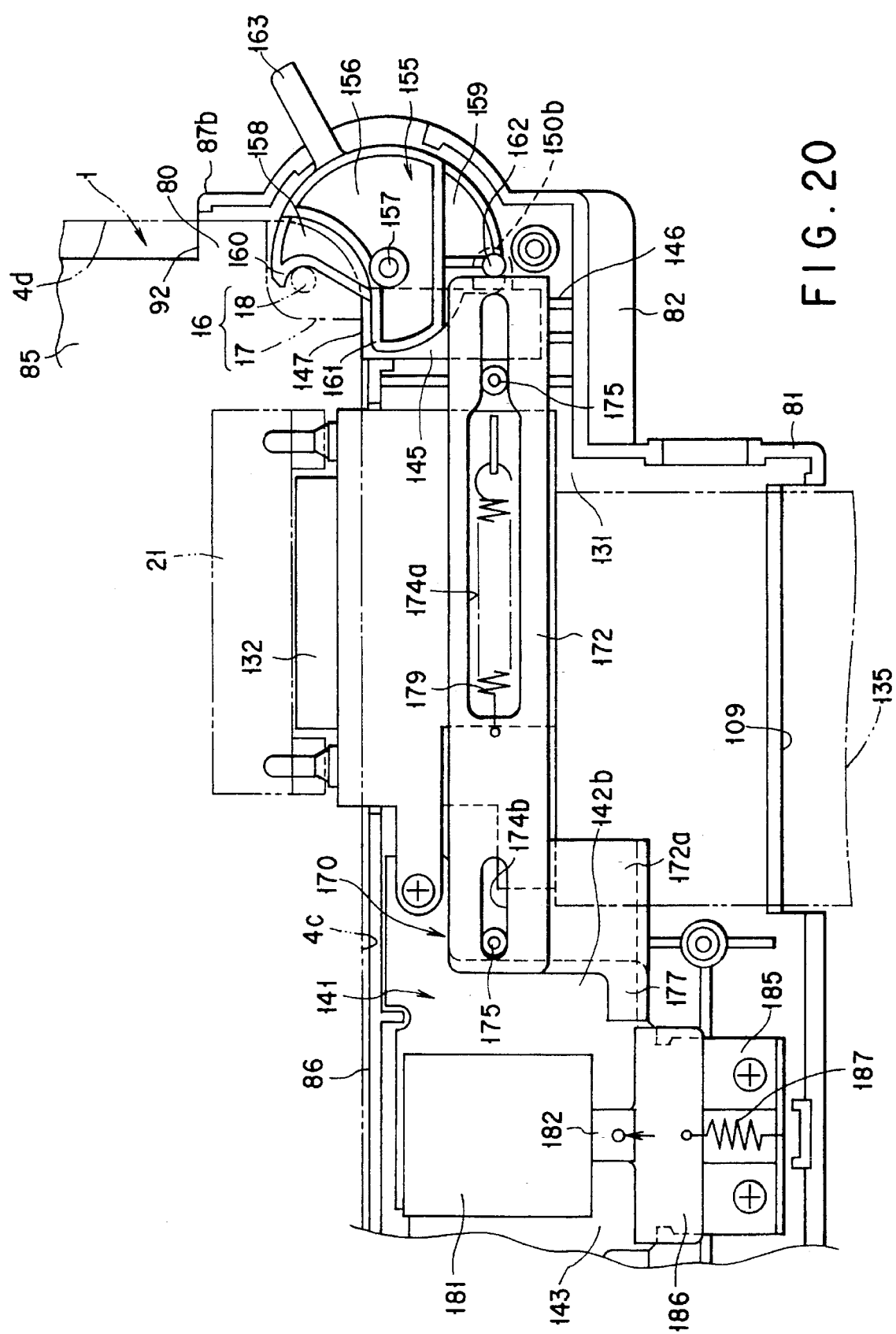
Figure 21:
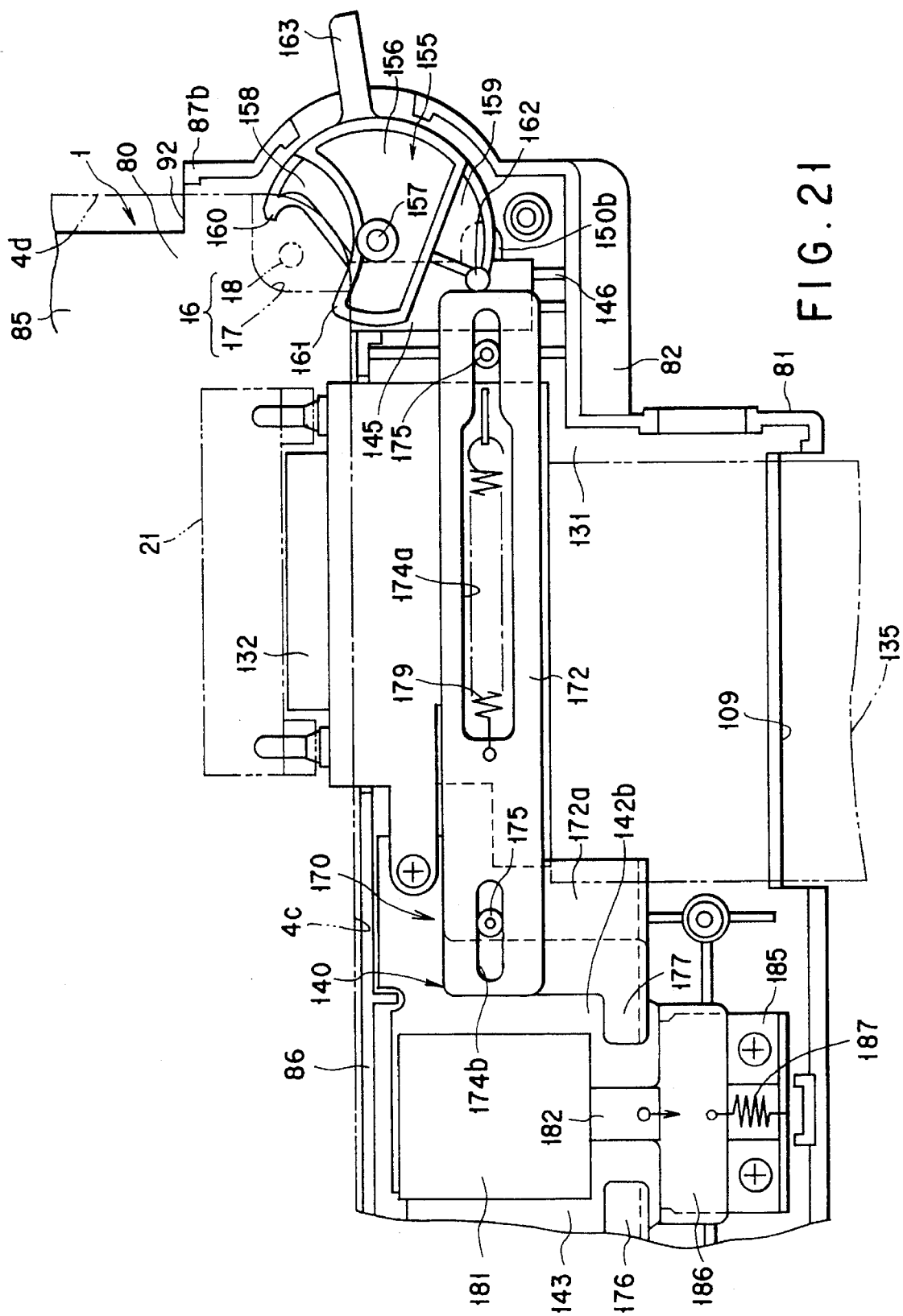

Thus, the engaging members 154 and 155 are supported by the rear panel 82 so as to be rotatable between a first position (as shown in FIG. 20), in which the claw 160 is engaged with the shaft 18 of the strap attachment portion 16, and a second position (as shown in FIG. 21), in which the claw 160 is removed from the recess 17 of the strap attachment portion 16. When the engaging members 154 and 155 are located at the first position, the push portion 161 is located at substantially the same plane as the end walls 86 and 89 and faces the third side surface 4c of the computer 1. When the engaging members 154 and 155 are located at the second position, the push portion 161 projects above the end walls 86 and 89 and abuts on the third side surface 4c of the computer.

The second portion 159 of the main body 156 has a link pressing portion 162. The link pressing portion 162 is located at the opposite side of the pivot shaft 157 from the claw 160. The main body 156 has a lever portion 163, on which the operator puts a finger, and which is projected sideways from the holding portion 80. With this structure, when the lever portions 163 of the engaging members 154 and 155 are pressed downward by fingers, the engaging members are manually rotated from the first position to the second position.

Figure 22:
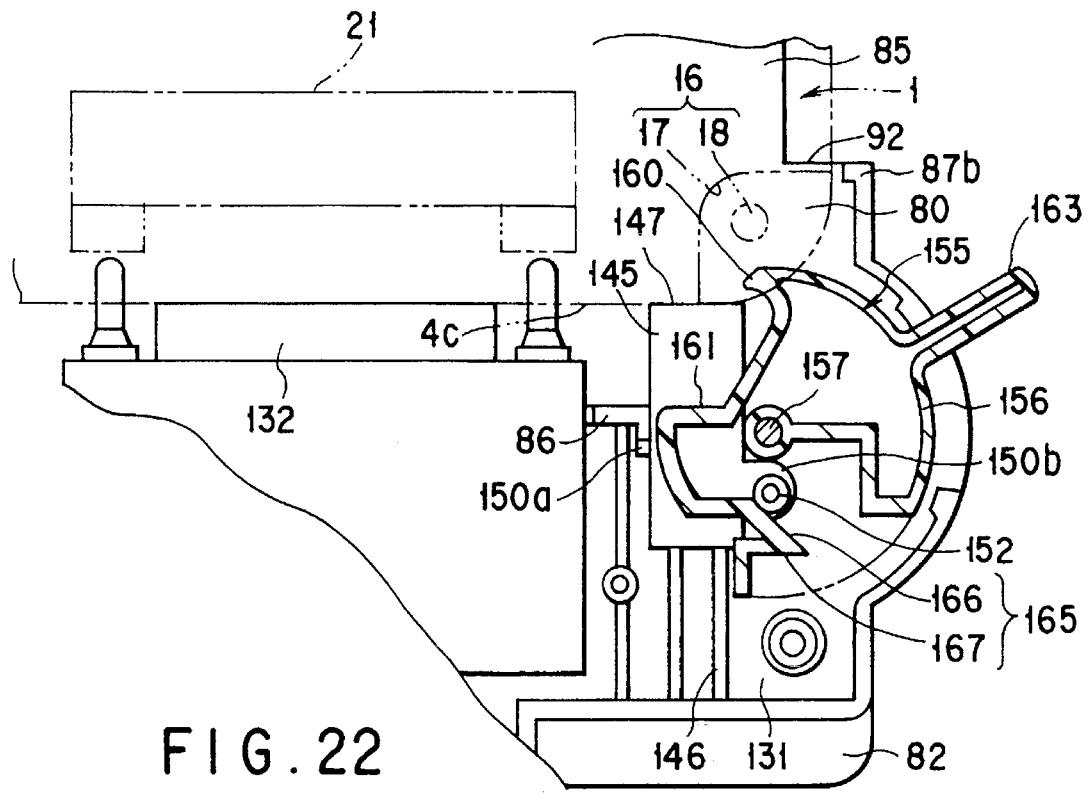

The engaging members 154 and 155 work in cooperation with the plungers 144 and 145. The cooperation of the right plunger 145 and the engaging member 155 will be described as a representative. As shown in FIG. 22, the main body 156 of the engaging member 155 includes a guide portion 165 which faces the plunger 145. The guide portion 165 has a cam surface 166 slidably in contact with the guide projection 152 of the plunger 145 and a recess portion 167 connected to the cam surface 166. The cam surface 166 inclines downward under the pivot shaft 157. With this structure, when the plunger 145 is pressed downward as the computer 1 is inserted, the guide projection 152 presses the cam surface 166 downward, thereby rotating the engaging member 155 clockwise on the pivot shaft 157. Thus, the engaging member 155 is rotated from the first position to the second position in accordance with the insertion of the computer 1. When the plunger 145 is pressed down to a maximum extent, the guide projection 152 is moved over the cam surface 166 and faces the recess portion 167, with the result that the engaging member 155 is released from the plunger 145. In this embodiment, therefore, the guide projection 152 and the guide portion 165 constitute linkage means for linking the plunger 145 and the engaging member 155.

As shown in FIG. 17, the storage chamber 131 contains a lock mechanism 170 for holding the engaging members 154 and 155 at the first position. The lock mechanism 170 comprises a pair of link members 171 and 172 made of metal. The link members 171 and 172 are elongated plates, supported by the link supporting portions 142a and 142b of the middle frame 141 and extending in the width direction of the storage chamber 131.

Guide holes 173a and 173b are formed in both end portions of the link member 171, and guide holes 174a and 174b are formed in both end portions of the link member 172. The guide holes 173a, 173b, 174a and 174b are elongated holes. Guide pins 175 projected from the rear panel 82 and the link supporting portions 142a and 42b are slidably engaged with the guide holes 173a, 173b, 174a and 174b. With this engagement, the link members 171 and 172 are supported by the rear panel 82 so as to be slidable in the width direction of the holding portion 80. The link members 171 and 172 are opposed to each other with the solenoid supporting portion 143 interposed therebetween. For this reason, the link members 171 and 172 are slidable in the storage chamber 131 in the directions so as to be removed from each other.

Extended portions 171a and 172a, extended downward, are formed in the opposed end portions of the link members 171 and 172. The extended portions 171a and 172a respectively include engaging pieces 176 and 177. The engaging pieces 176 and 177 are opposed to each other with the solenoid supporting portion 143 interposed therebetween. The other end portions of the link members 171 and 172, which do not include the engaging pieces, are brought into contact with the link pressing portions 162 of the engaging members 154 and 155. The link members 171 and 172 are biased in the opposite directions so as to be in contact with the link pressing portions 162 via extension coil springs 179. For this reason, the link members 171 and 172 are slidable leftward and rightward in accordance with the rotation of the engaging members 154 and 155, and normally press the engaging members 154 and 155 toward the first position due to the contact with the link pressing portions 162.

As shown in FIGS. 17 and 30, an electromagnetic solenoid 181 is attached to the solenoid supporting portion 143 of the middle frame 141. The electromagnetic solenoid 181 comprises an armature 182, which is linearly moved in vertical directions. When the power unit 42 is turned on and the power supply voltage (VCC) is generated, the electromagnetic solenoid 181 is excited by the power supply voltage and draws up the armature 182.

Figure 28:
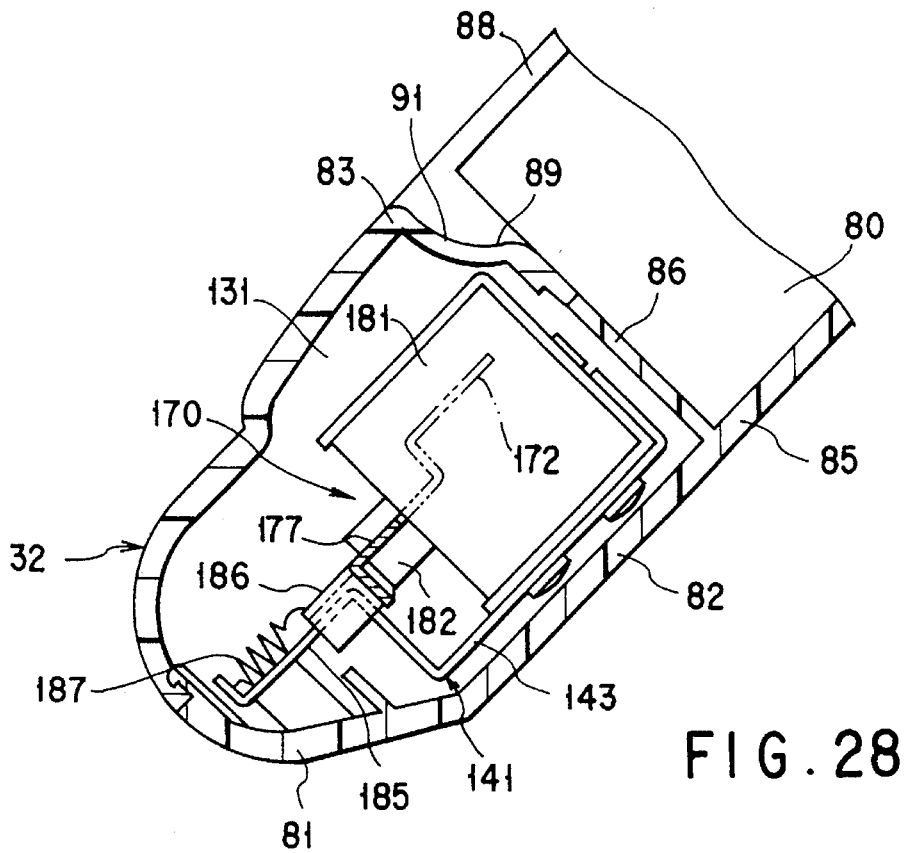
Figure 29:
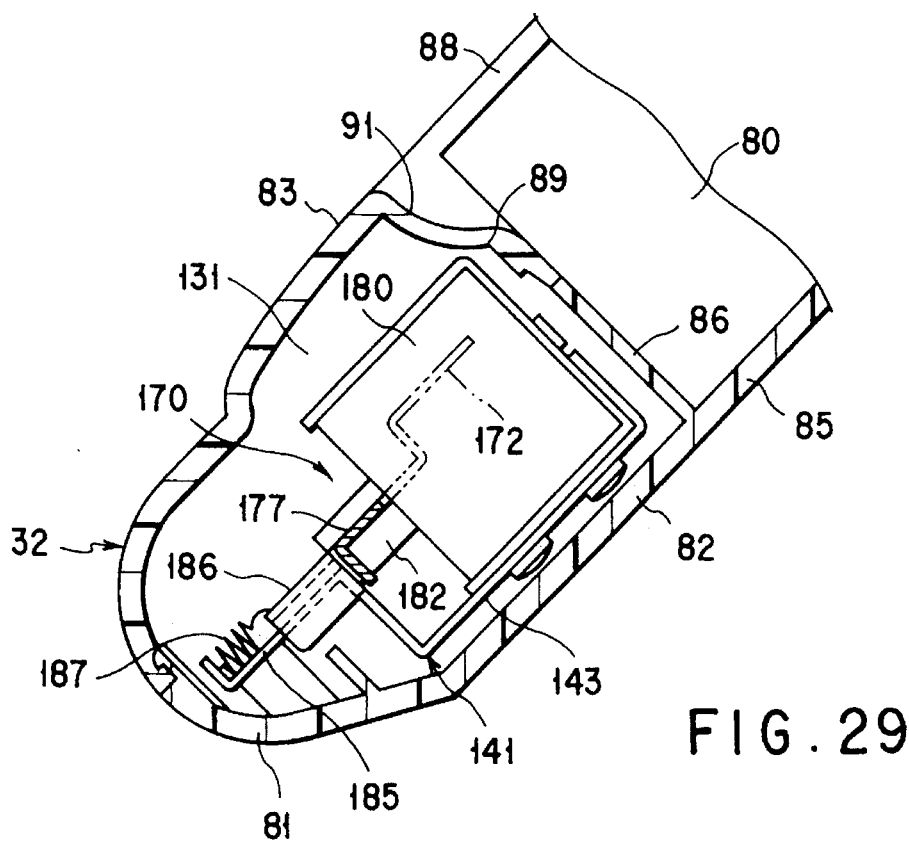

As shown in FIG. 18, the solenoid supporting portion 143 integrally comprises a slide guide portion 185. The slide guide portion 185 extends in a direction in which the armature 182 is moved. A metal stopper 186 is slidably supported by the slide guide portion 185. The stopper 186 is movable between a lock position in which the stopper 186 is interposed between the engaging pices 176 and 177 to prevent the link members 171 and 172 from sliding as shown in FIGS. 17 and 28, and a lock release position in which the stopper 186 is removed from the link members 171 and 172 to allow the link members 171 and 172 to slide, as shown in FIGS. 21 and 29. The stopper 186 is normally held at the lock release position by means of an extension coil spring 187. The stopper 186, connected to the armature 182 of the electromagnetic solenoid 181, is slidable toward the lock position, when the electromagnetic solenoid 181 is excited.

Procedures for connecting the pen-input type computer 1 to the expansion station 30 will now be described.

First, the plug connected to the commercial power supply 60 is inserted in the power supply receptacle 59 of the expansion station 30, so that the expansion station 30 can be on standby. After confirming whether the power switch 22 of the computer 1 is off, the case 2 of the computer 1 is inserted in the holding portion 30 of the stand 32 in the direction in which the third side surface 4c is placed ahead. At this time, since the smoothing members 97 are adhered to the supporting wall 85 and the side walls 87a and 90a of the holding portion 80, the case 2 of the computer 1 is inserted in the holding portion 80, while it is being in contact with the smoothing members 97. For this reason, the sliding resistance between the case 2 and the holding portion 80 is reduced, so that the case 2 can be inserted smoothly with small force. In addition, if the case 2 is coated with paint, the paint can be prevented from being removed due to the sliding contact with the inner surface of the holding portion 80, thereby protecting the case 2 from damage.

When the case 2 is inserted in the holding portion 80 as shown in FIG. 22, the end portions of the third side surface 4c of the case 2 are brought into contact with the pressing surfaces 147 of the plungers 144 and 145. The strap attachment portions 16 at the corners of the case 2 face the claws 160 of the engaging members 154 and 155. The claws 160 partially enter the recesses 17 of the strap attachment portions 16. At the same time, the first connector 21 of the computer 1 faces the second connector 132 of the holding portion 80.

Figure 23:
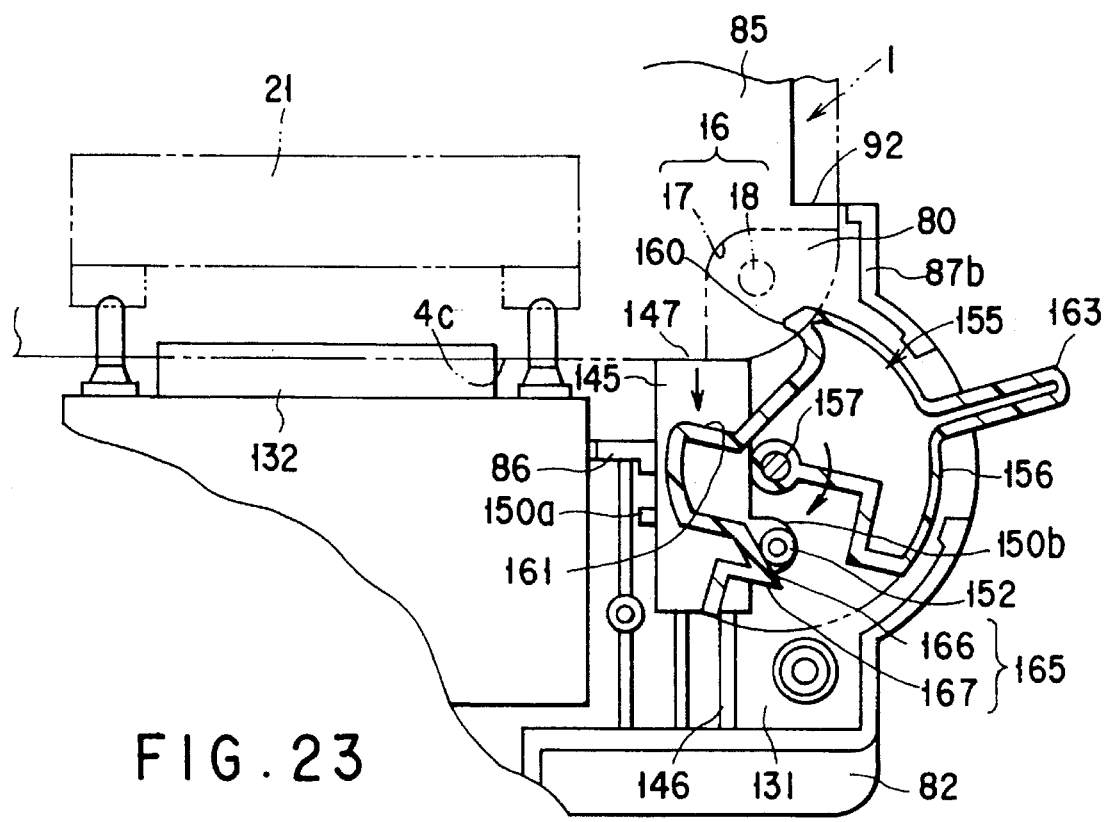
Figure 24:
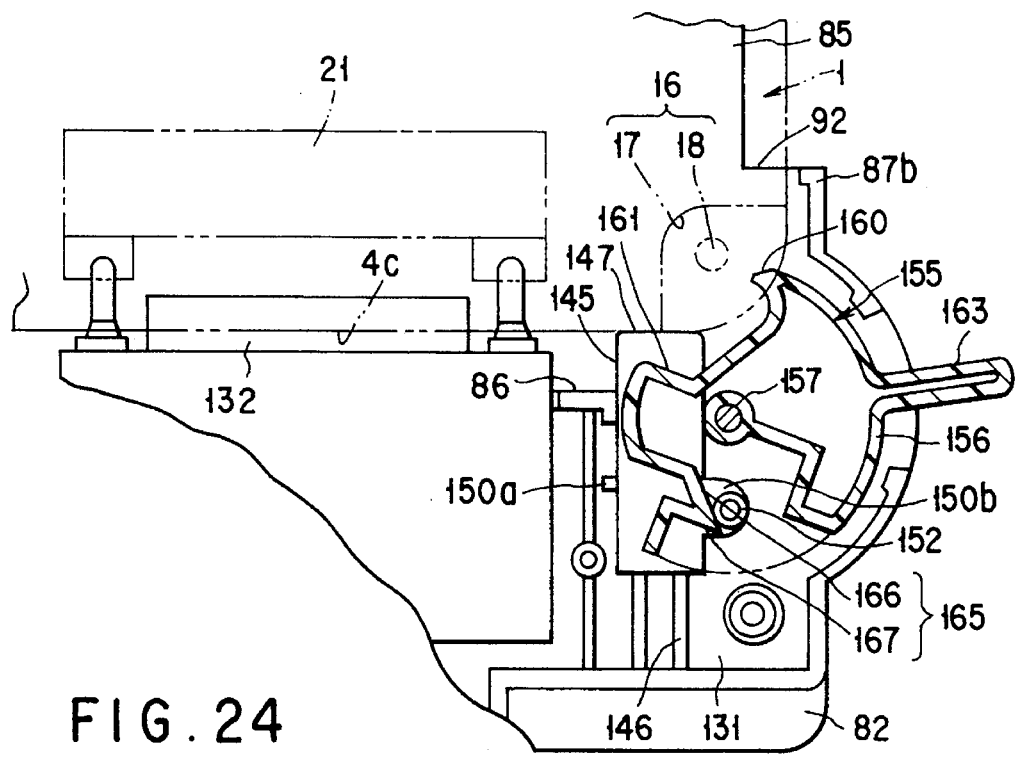

In this state, when the case 2 is further pressed in, the plungers. 144 and 145 are pressed downward against the compression coil springs 148. The engaging members 154 and 155 are gradually rotated from the first position to the second position in association with the movement of the plungers 144 and 145. More specifically, as shown in FIG. 23, when the plungers 144 and 145 are pressed down by means of the case 2, the guide projections 152 of the plungers 144 and 145 are moved downward. At this time, since the guide projection 152 is slidably in contact with the cam surface 166, the cam surface 166 receives downward pressing force due to the contact with the guide projection 152. Since the cam surfaces 166 are inclined downward under the pivot shafts 157, the engaging members 154 and 155 receive force to rotate them clockwise on the pivot shafts 157, as the contact between the guide projection 152 and the cam surface 166 is moved down. The engaging members 154 and 155 thus start rotating from the first position to the second position. With this rotation, the claws 160 of the engaging members 154 and 155 move so as to be removed from the shafts 18 in the recesses 17, thereby avoiding an interference between the shaft 18 and the claw 160 during the insertion of the computer 1. When the claws 160 are removed from the shafts 18, the first and second connectors 21 and 132 are brought into contact with each other. The connectors 21 and 132 are gradually engaged with each other in accordance with the insertion of the computer 1.

Figure 25:
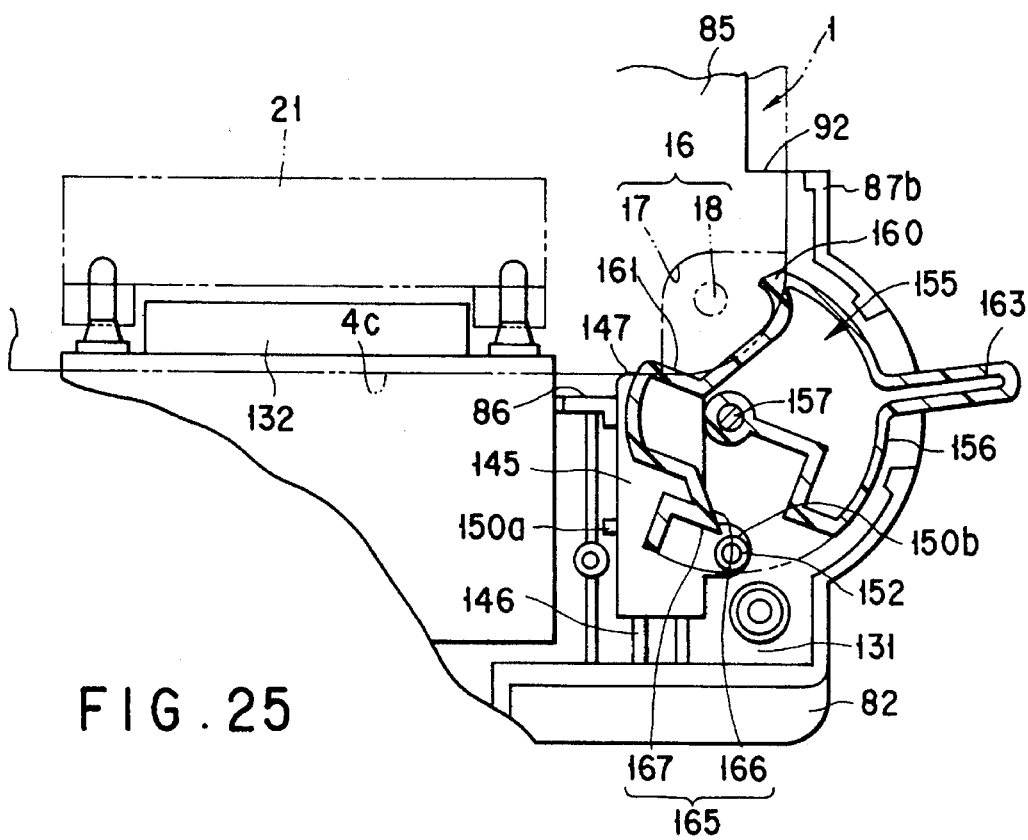

As shown in FIG. 25, the guide projection 152 moves over the cam surface 166 and faces the recess portion 167, immediately before the first and second connectors 21 and 132 are completely connected to each other. As a result, the engaging members 154 and 155 are rotated to the second position, thus releasing the engaging members 154 and 155 from the plungers 144 and 145.

When the engaging members 154 and 155 are rotated from the first position to the second position, the link pressing portions 162 of the engaging members 154 and 155 are moved obliquely upward. Since the ends of the link members 171 and 172 are in contact with the link pressing portions 162, the link members 171 and 172 are pressed in directions in which they approach each other. At this time, since the electromagnetic solenoid 181 is not excited, the armature 182 projects downward and the stopper 186 attached to the armature 182 is held at the lock release position. For this reason, as shown in FIGS. 21 and 29, the engaging pieces 176 and 177 of the link members 171 and 172 do not abut against the stopper 186 but enter the space between the stopper 186 and the electromagnetic solenoid 181. Thus, the link members 171 and 172 do not interfere with the rotation of the engaging members 154 and 155.

Figure 26:
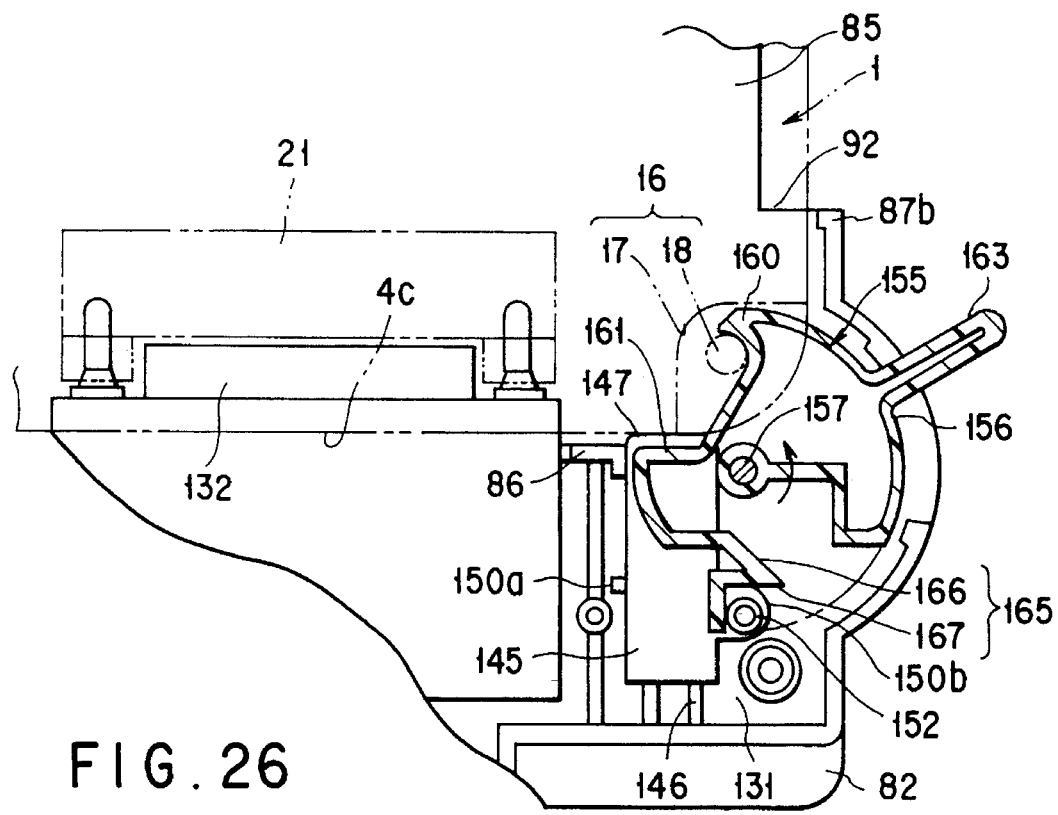

When the engaging members 154 and 155 are rotated to the second position, they are released from the plungers 144 and 145 as described above and become rotatable freely. At this time, the link members 171 and 172 are biased in,the directions so as to be brought into contact with the link pressing portions 162 of the engaging members 154 and 155 via the extension coil springs 179 and press the engaging members 154 and 155 toward the first position. Therefore, the engaging members 154 and 155 are forced to rotate to the first position, as shown in FIGS. 21 and 26. As a result, as shown in FIG. 20, the claws 160 of the engaging members 154 and 155 enter the recesses 17 of the strap attachment portions 16 and hook on the shafts 18. Thus, the computer 1 is prevented from slipping out of the holding portion 80, thereby maintaining the connection between the first and second connectors 21 and 132.

The electromagnetic solenoid 181 of the holding portion 80 is not excited until the power switch 22 of the computer 1 is turned on. The stopper 186 is therefore maintained at the lock release position, when the computer 1 is only inserted in the holding portion 80. Hence, in this state, the engaging members 154 and 155 are rotatable freely from the first position to the second position. In other words, the engaging members 154 and 155 can be rotated toward the second position by depressing the lever portions 163 with fingers, so that the claws 160 can be disengaged from the strap attachment portions 16.

As shown in FIG. 25, when the engaging members 154 and 155 are rotated to the second position, the guide projection 152 is removed from the recess portion 167. Since the plungers 144 and 145 are therefore pressed upward by the compression coil springs 148, the computer 1 receives force to press it out of the holding portion 80. In addition, when the engaging members 154 and 155 are rotated to the second position, the push portions 161 protrude from the bottom of the holding portion 80, thereby pressing upward the third side surface 4c of the computer 1. As a result, the first connector 21 is released from the second connector 132, so that the computer 1 can be removed from the holding portion 80.

In the state where the computer 1 is inserted in the holding portion 80 of the expansion station 30, when the power switch 22 of the computer 1 is turned on, the power controller 23 of the computer 1 outputs a signal. The signal is input to the power unit 42 of the expansion station 30 through the first connector 21 and the second connector 132. As a result, the power unit 42, which has been on standby, is turned on and generates the power supply voltage (VCC).

When the power supply voltage is generated, the electromagnetic solenoid 181 is excited, so that the stopper 186, which has been maintained at the lock release position, is moved to the lock position. For this reason, as shown in FIGS. 20 and 28, the stopper 186 is inserted between the engaging pieces 176 and 177 of the link members 171 and 172, thereby inhibiting the link members 171 and 172 from sliding so as to approach each other. Therefore, even if the operator tries to rotate the engaging members 154 and 155 from the first position to the second position, the engaging members 154 and 155 cannot be rotated to the second position due to the obstruction of the stopper 186.

Thus, when the power switch 22 of the computer 1 is turned on and a signal is transmitted between the computer 1 and the expansion station 30, the engagement between the computer 1 and the engaging members 154 and 155 cannot be released, so that the computer 1 cannot be removed from the holding portion 80. Therefore, when the expansion station 30 is used, the computer 1 is inhibited from being removed therefrom, thus preventing erasure of important data or malfunction of the computer 1.

When the power supply voltage (VCC) is generated, so that a reset signal is output from the reset circuit 61, the reset signal is input to the power controller 23 of the computer 1 through the second connector 132 and the first connector 21. The power controller 23, upon reception of the reset signal, judges that the expansion station 30 is connected to the computer 1, and selects a next operation based on the judgment.

When the power switch 22 of the computer 1 is turned off, the power unit 42 of the expansion station 30 is shifted to the standby state in response to a signal output from the power controller 23, so that the excitation of the electromagnetic solenoid 181 is released. As a result, the armature 182 of the electromagnetic solenoid 181 protrudes downward and the stopper 186 is slid from the lock position to the lock release position. Thus, the inhibition of slide of the link members 171 and 172 by the stopper 186 is released, and the lever portions 163 of the engaging members 154 and 155 can be pressed down by fingers. Therefore, the engaging members 154 and 155 can be rotated from the first position to the second position.

When the engaging members 154 and 155 are rotated to the second position, the claws 160 are removed from the strap attachment portions 16 and the hold of the computer 1 is released. At the same time, the plungers 144 and 145, which have been pressed downward by the computer 1, are now pressed upward by the compression coil springs 148. The computer 1 thus receives force by which it is pressed out of the holding portion 80 when the engaging members 154 and 155 are rotated to the second position, the push portions 161 presses upward the third side surface 4c of the computer 1. Since the first connector 21 is disconnected from the second connector 132 in this manner, it is unnecessary to apply great force, which exceeds the force for engaging the connectors 21 and 132, in order to draw the computer 1 from the holding portion 80. The mechanism of the engaging members, as well as the smoothing members 97 adhered to the inner surface of the holding portion 80, allows the computer 1 to be easily detached from the holding portion 80.

According to the first embodiment as described above, the current supply to the electromagnetic solenoid 181 is controlled by turning on and off the power switch 22 of the computer 1. Therefore, no particular lock operation or lock releasing operation is required in addition to the on/off operation of the power switch 22, ensuring that the computer 1 can be locked and released easily and reliably.

The lock mechanism 170 for locking the engaging members 154 and 155 at the first position comprises the pair of link members 171 and 172, which are slidable to be close to or removed from each other, in association with the rotation of the engaging members 154 and 155. The single stopper 186 is inserted in and drawn from the space between the engaging pieces 176 and 177 of the link members 171 and 172. Hence, it is only necessary to provide the single electromagnetic solenoid 181 for moving the stopper 186 between the lock position and the lock release position, i.e., the locking system common to the pair of engaging members 154 and 155. Accordingly, the lock mechanism 170 has a more simple structure as compared to a case in which locking mechanisms are prepared for the respective engaging members 154 and 155, thus reducing the cost required for the expansion station 30.

Moreover, when the computer 1 is inserted in the holding portion 80, the claws 160 of the engaging members 154 and 155 hook the strap attachment portions 16 of the computer 1. Therefore, the computer 1 can be held by the holding portion 80 so as not be removed therefrom, even when the power switch 22 is not turned on. To remove the computer 1 from the holding portion 80, an intentional operation of depressing the lever portions 163 with fingers is required to rotate the engaging members 154 and 155 from the first position to the second position. For this reason, it is possible to prevent the computer 1 from being removed or undesirably drawn from the holding portion 80.

When the computer 1 is inserted in the holding portion 80 of the expansion station 30, the computer 1, together with the input surface 9, is kept in a standing position, so that the input surface 9 faces the operator. Therefore, the visibility of the input surface 9 is improved and the operability of depressing the input surface 9 with the stylus pen 10 is also improved. In this case, since the supporting wall 85 of the holding portion 80 has the rotatable leg portion 110, the stand angle α of the computer 1 can be changed in four stages in accordance with selected one the engaging grooves 62a to 62d in which the leg portion 110 is inserted. The inclination of the input surface 9 can therefore be adjusted freely in accordance with the situation in which the computer 1 is used, resulting in improvement of the operability of the computer 1.

Further, since the leg portion 110 supports the back of the supporting wall 85 of the standing holding portion 80, the computer 1 inserted in the holding portion 80 can be supported firmly. For this reason, even when the input surface 9 of the computer 1 is pressed by the stylus pen 10 in the state where the computer 1 is held in the holding portion 80, the holding portion 80 is not rattled. As a result, the input operability of the stylus pen 10 is improved.

In addition, the holding portion 80 has the cut portions 91 and 92 for exposing the pen storage portion 14 and the card inserting port 11 of the computer 1. For this reason, the stylus pen 10 and various expansion cards can be inserted in or drawn from the case 2, while the computer 1 is held in the holding portion 80. Thus, the operability of the computer is improved.

Moreover, in the above structure, the clips 95a and 95b respectively across the side walls 87a and 90a and across the side walls 87b and 90b of the front panel 83 and the rear panel 82 are engaged with the opening 94 of the holding portion 80. Therefore, while the computer 1 is being inserted in or removed from the holding portion 80, even if force to remove the panels 82 and 83 from each other is applied to the portions at which the panels 82 and 83 are engaged, the side walls 87a and 90a and the side walls 87b and 90b are kept engaged with each other by the claws 93. Further, in this case, excessive force is not applied to the claws 93, with the result that the claws 93 are prevented from damage, and accordingly, the rear panel 82 and the front panel 83 are prevented form being separated.

Figure 34:
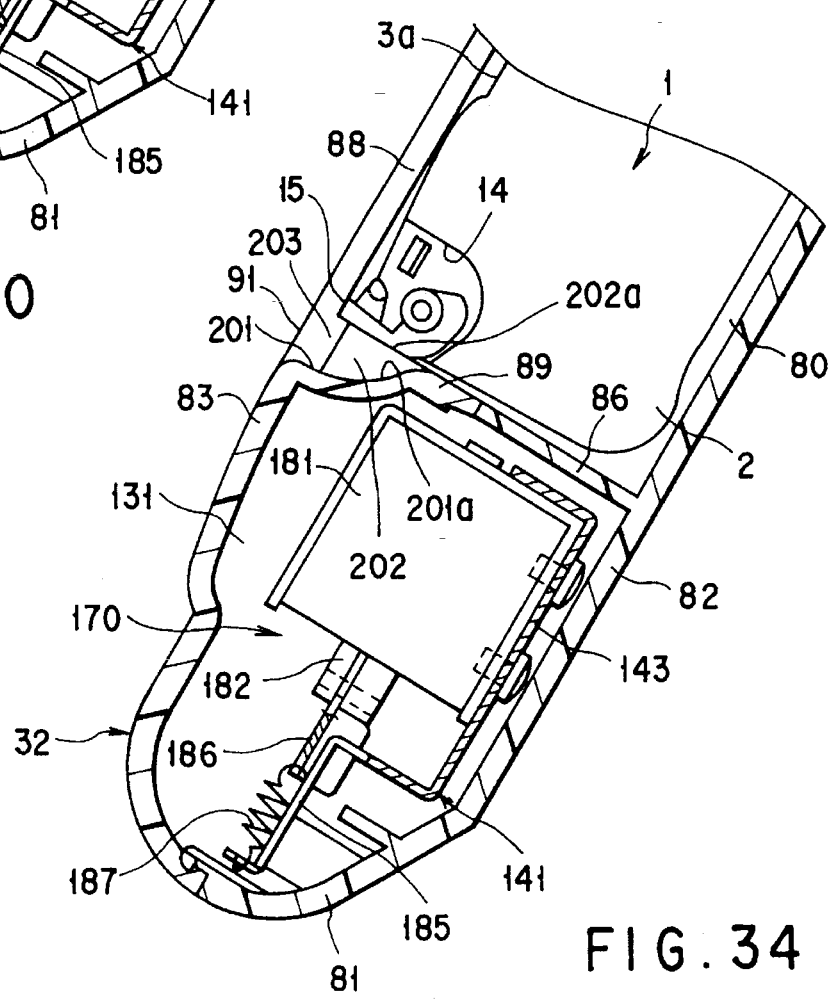
Figure 32:
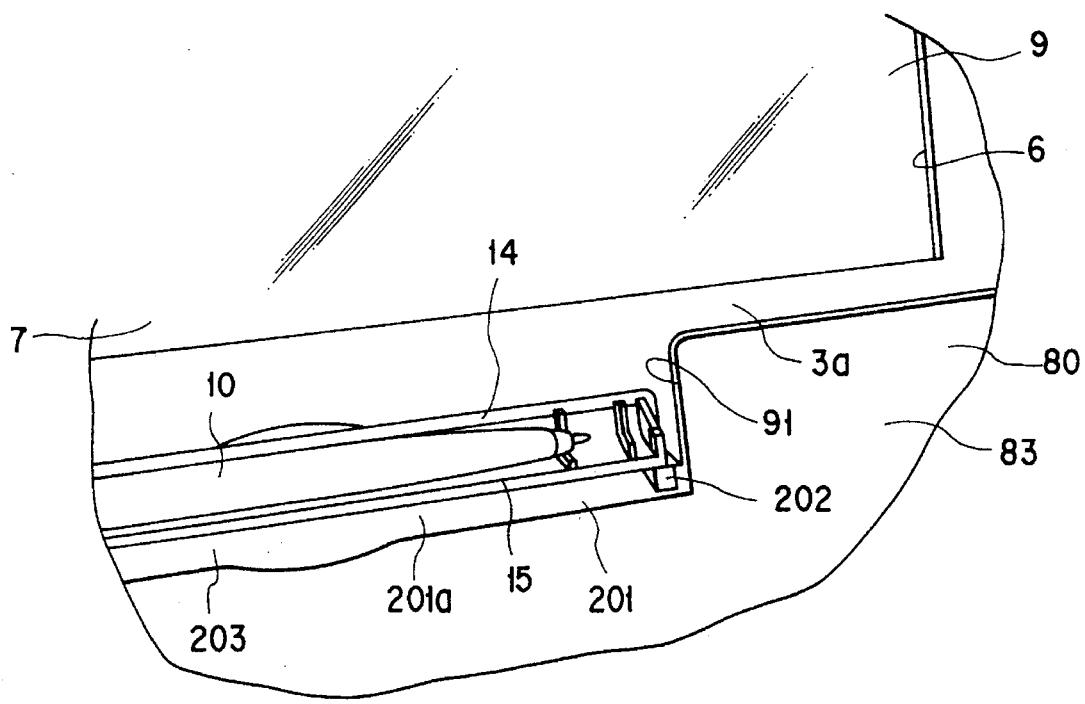
Figure 33:
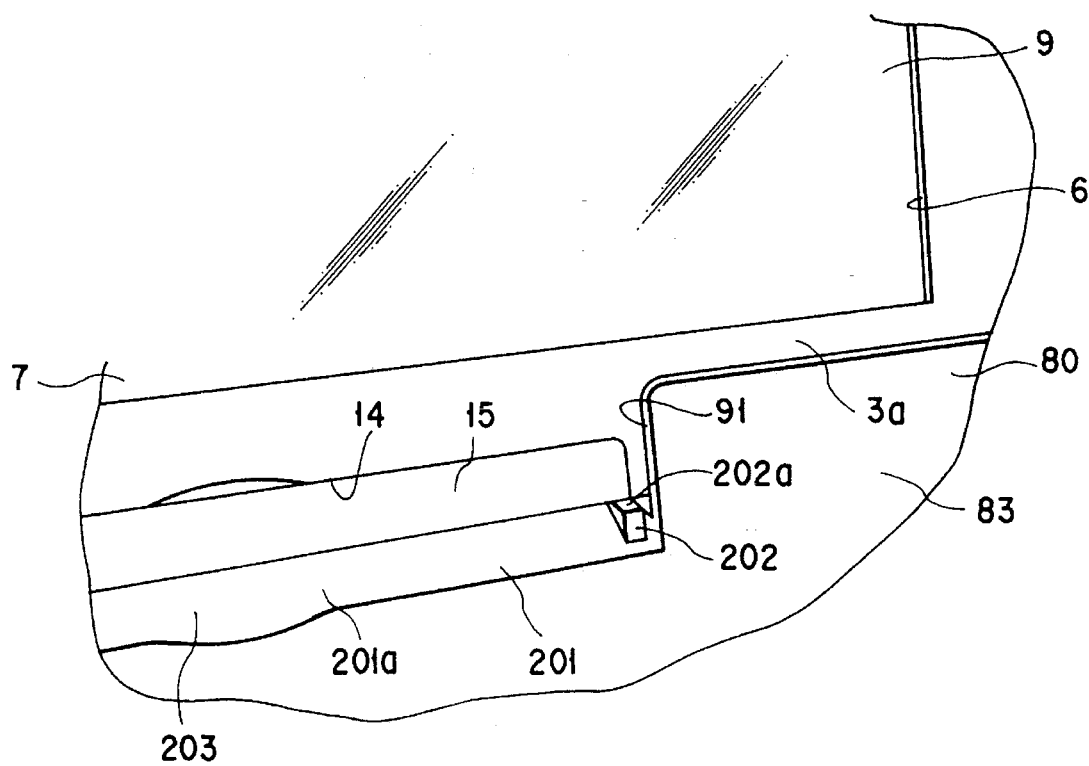

The present invention is not limited to the first embodiment as described above. FIGS. 32 to 34 show a second embodiment of the present invention. The second embodiment is the same as the first embodiment, except for the structure of the cut portion 91 for exposing the pen storage portion 14 of the computer 1. Therefore, the same elements as in the first embodiment are identified with the same reference numerals, and descriptions thereof will be omitted.

As shown in FIGS. 32 to 34, the end wall 89 of the front panel 83 has a recess 201 which ranges to the cut portion 91. The recess 201 extends along the overall width of the cut portion 91 and has a curved bottom surface 201a. The recess 201 is opposed to the pen storage portion 14 of the computer 1, when the computer 1 is loaded in the holding portion 80.

Seat portions 202 are formed integral with both end portions of the recess 201. Each seat portion 202, protruding from the bottom surface 201a of the recess 201, has a seat surface 202a on the same plane as the end wall 89. When the pen cover 15 of the computer 1 loaded in the holding portion is rotated to the open position, the seat surface 202a is brought into contact with both end portions of the pen cover 15. For this reason, the open angle of the pen cover 15 is restricted so that a gap 203, in which a finger can be inserted, can be formed between the pen cover 15 and the bottom surface 201a of the recess 201.

According to the second embodiment having the above structure, in a state where the computer 1 is held in the holding portion 80, if the pen cover 15 is rotated to the open position, it is received by the seat surfaces 202a of the seat portions 202. For this reason, the pen cover 15 is never rotated to a position where it is brought into contact with the bottom surface 201a of the recess 201. In other words, the gap 203, in which a finger can be inserted, can be formed between the pen cover 15 and the bottom surface 201a of the recess 201. Thus, when the pen cover 15 is to be rotated from the open position to the closed position, the operator never fails to put a finger on an edge portion of the pen cover 15, so that the pen cover 15 can be closed easily.

In the present invention, the electronic device to be connected to the expansion station is not limited to a pen-input type portable computer, but can be a sentence creating apparatus of pen-input type.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An electronic device system comprising:

a portable electronic device including an input surface through which information is input, a power switch manually turned on or off, and a first connector electrically connected to the power switch; and an expansion station having an expansion device for expanding a function of the electronic device and an input section connected to a power supply, the expansion station including: a main body containing the expansion device and the input section; a stand supported by the main body and removably holding the electronic device, the stand maintaining the main body together with the input surface in a stand-up state; and a second connector arranged in the stand, the second connector being electrically connected to the expansion device and the input section, and connected to the first connector when the electronic device is held by the stand, wherein the stand includes: a pair of engaging members movable between a first position, in which they hook first and second ends in a width direction of the electronic device, and a second position, in which they are released from the first and second ends of the electronic device, when the first and second connectors are connected to-each other; and lock means movable between a lock position, in which the engaging members are inhibited from being moved from the first position to the second position, and a lock release position, in which the engaging members are allowed to move from the first position to the second position; and the lock means is maintained in the lock position, when the electronic device is connected to the power supply through the first and second connectors and the power switch of the electronic device is turned on.

2. The electronic device system according to claim 1, wherein the stand is supported by the main body via a horizontal shaft so as to be rotatable upward and downward.

3. The electronic device system according to claim 2, wherein the expansion station has a leg portion, put across the stand and the main body, for supporting the stand from a back side, a first end of the leg portion being rotatably coupled with the stand and a second end thereof being engaged with the main body so as to be movable in a depth direction of the main body.

4. The electronic device system according to claim 1, wherein:

the electronic device includes means for outputting a signal to the first connector, when the power switch is turned on; and the lock means includes: a pair of link members slidable in directions so as to be closed to and removed from each other in accordance with movement of the engaging members; a stopper movable between a first position, in which it is inserted in a space between the link members so as to prevent the link members from sliding, and a second position, in which it is retracted from the space so as to allow the link members to slide; and an electromagnetic solenoid, electrically connected to the second connector, for selectively moving the stopper to the first or second position, the electromagnetic solenoid being excited upon reception of a signal representing that the power switch of the electronic device is turned on, so as to move the stopper from the second position to the first position.

5. The electronic device system according to claim 4, wherein the lock means includes a spring for maintaining the link members in contact with the engaging members, so that the engaging members are held at the first position by the contact between the link members and the engaging members.

6. The electronic device system according to claim 1, wherein the engaging members include lever portions projecting outwards from the stand.

7. The electronic device system according to claim 1, wherein:

the engaging members include claw portions; and the first and second ends of the electronic device have recess portions in which the claw portions are removably inserted, and shaft portions which is arranged within the recess portions, and with which the claw portions are engaged, when the engaging members are moved to the first position.

8. The electronic device system according to claim 1, wherein:

the electronic device has a flat case having an upper surface including the input surface, a bottom surface opposite to the upper surface, and a side surface in which the first connector is arranged; and the stand of the expansion station has an opening through which an end portion of the case is removably inserted and a holding portion in which the second connector is arranged at a position opposing to the opening, the case of the electronic device being inserted in the opening with the first connector directed to the second connector, so that the case can be held by the holding portion.

9. The electronic device system according to claim 8, wherein the holding portion comprises:

a pair of plungers slid in accordance with insertion of the electronic device;

linkage means operating in accordance with movement of the plungers, such that the linkage means is engaged with the engaging members and forces the engaging members to move from the first position to the second position, when the electronic device is being inserted in the opening, and disengaged from the engaging members, when the electronic device is completely inserted; and a spring for biasing the electronic device via the plungers so as to be pressed out of the holding portion.

10. The electronic device system according to claim 8, wherein the holding portion has a front panel and a rear panel fitted with the front panel, the front and rear panels having edges which are engaged with each other and range to the opening, and end portions of the edges being coupled with each other by clips arranged across the front panel and the rear panel.

11. The electronic device system according to claim 8, wherein:

the electronic device has a stylus pen for inputting information to the input surface;

the case of the electronic device has a pen storage portion for storing the stylus pen; and the holding portion of the stand has a cut portion for exposing the pen storage portion, when the case is held by the holding portion.

12. The electronic device system according to claim 11, wherein the pen storage portion has a recess formed in the upper surface of the case and a pen cover rotatable between a closed position in which the recess is closed and an open position in which the recess is opened, the pen cover facing the cut portion, when the case is held by the holding portion.

13. The electronic device system according to claim 8, wherein:

the case of the electronic device has a card inserting port through which a card-like electronic part is inserted; and the holding portion of the expansion station has a cut portion through which the card inserting port is exposed.

14. A computer system comprising:

a portable computer having a pen for inputting information, an input surface pressed by the pen, a power switch manually turned on or off, a controller for outputting a signal, when the power switch is turned on, and a first connector to which the signal from the controller is supplied;

an expansion station having an expansion device for expanding a function of the computer and an input section connected to a power supply, the expansion station including: a main body containing the expansion device and the input section; a holding portion supported by the main body and removably holding the computer, the holding portion maintaining the main body together with the input surface in a stand-up state: and a second connector arranged in the holding portion, the second connector being electrically connected to the expansion device and the input section, and connected to the first connector when the computer is held by the holding portion, wherein the holding portion includes: a pair of engaging members movable between a first position in which they hook the computer and a second position in which they are released from the computer, when the first and second connectors are connected to each other; and lock means movable between a lock position, in which the engaging members are inhibited from being moved from the first position to the second position, and a lock release position, in which the engaging members are allowed to move from the first position to the second position; and the lock means is maintained in the lock position, when the computer is connected to the power supply through the first and second connectors and the lock means receives the signal output from the controller through the first and second connectors.

* * * * *